(12) United States Patent
Tsukerman et al.

(10) Patent No.: US 8,944,456 B2
(45) Date of Patent: Feb. 3, 2015

(54) DIMENSIONALLY ADJUSTABLE VEHICLE

(75) Inventors: Boris Tsukerman, Rishon LeZion (IL);
Arie Flumin, Rehovot (IL); Nils Rabota, Montreal (CA)

(73) Assignee: Boris Tsukerman, Rishon LeZion (IL)

( * ) Notice: Subject to any disclaimer, the term of this patent is extended or adjusted under 35 U.S.C. 154(b) by 0 days.

(21) Appl. No.: 14/006,162

(22) PCT Filed: Jan. 26, 2012

(86) PCT No.: PCT/IL2012/000045
§ 371 (c)(1),
(2), (4) Date: Sep. 19, 2013

(87) PCT Pub. No.: WO2012/127459
PCT Pub. Date: Sep. 27, 2012

(65) Prior Publication Data
US 2014/0008897 A1    Jan. 9, 2014

(30) Foreign Application Priority Data

Mar. 21, 2011    (IL) .......................................... 211838

(51) Int. Cl.
*B62B 1/00*    (2006.01)
*B62D 47/00*    (2006.01)
(Continued)

(52) U.S. Cl.
CPC .............. *B62D 47/003* (2013.01); *B62D 21/14* (2013.01); *B62D 23/005* (2013.01); *B62D 31/003* (2013.01); *B62D 31/006* (2013.01)
USPC ............................ 280/638; 280/639; 280/657

(58) Field of Classification Search
USPC ........ 180/311, 89.1, 208; 280/29, 400, 415.1, 280/638, 639, 42, 657; 296/26.01, 26.02, 296/26.03, 26.11, 26.14
See application file for complete search history.

(56) References Cited

U.S. PATENT DOCUMENTS 873,711 A * 12/1907 Bruen ........................... 280/638
3,700,057 A * 10/1972 Boyd et al. ..................... 180/308
(Continued)

FOREIGN PATENT DOCUMENTS

DE    9208332 U1    1/1993
DE    20014245 U1    4/2001
(Continued)

OTHER PUBLICATIONS

Written Opinion/International Search Report issued in corresponding International Application No. PCT/IL2012/000045.

*Primary Examiner* — J. Allen Shriver, II
*Assistant Examiner* — James M Dolak
(74) *Attorney, Agent, or Firm* — Patrick J. Hagan; Dann, Dorfman, Herrell and Skillman, P.C.

(57) ABSTRACT

A dimensionally adjustable vehicle, which comprises a platform of pivoting and non-pivoting plates arranged such that the spacing between a pair of the non-pivoting plates is changed to dimensionally adjust the vehicle upon application of an initiating force to a plurality of the pivoting plates which causes a pivoting motion. A section of the platform includes a pair of laterally adjacent and laterally pivoting plates which is interposed between a pair of the non-pivoting plates such that a lateral side of each of the laterally pivoting plates is pivotally connected to a lateral side of an adjacent non-pivoting plate. Application of the initiating force the pair of laterally adjacent and laterally pivoting plates causes a lateral dimension of the vehicle to be adjusted.

20 Claims, 23 Drawing Sheets

(51) Int. Cl.
*B62D 21/14* (2006.01)
*B62D 23/00* (2006.01)
*B62D 31/00* (2006.01)

(56) References Cited

U.S. PATENT DOCUMENTS

| | | | | |
|---|---|---|---|---|
| 3,850,472 | A | * | 11/1974 | Greppi ........................ 296/26.11 |
| 3,966,220 | A | * | 6/1976 | Forsyth et al. ................ 280/638 |
| 4,231,144 | A | * | 11/1980 | Bernacchia, Jr. ............. 29/401.1 |
| 4,340,124 | A | * | 7/1982 | Leonard ........................ 180/208 |
| 4,834,409 | A | * | 5/1989 | Kramer ......................... 180/209 |
| 5,042,831 | A | * | 8/1991 | Kuhns ........................... 280/656 |
| 6,371,766 | B1 | * | 4/2002 | Doll et al. ..................... 434/373 |
| 7,140,629 | B2 | * | 11/2006 | Chen ............................. 280/287 |
| 7,703,567 | B2 | * | 4/2010 | Wang ............................ 180/208 |
| 7,950,686 | B2 | * | 5/2011 | Wang ............................ 280/643 |
| 8,384,704 | B2 | * | 2/2013 | Maki et al. .................... 345/211 |
| 2008/0309046 | A1 | | 12/2008 | Wang |

FOREIGN PATENT DOCUMENTS

| | | |
|---|---|---|
| FR | 1157924 A | 6/1958 |
| FR | 1513216 A | 2/1968 |
| FR | 2812608 A1 | 2/2002 |

\* cited by examiner

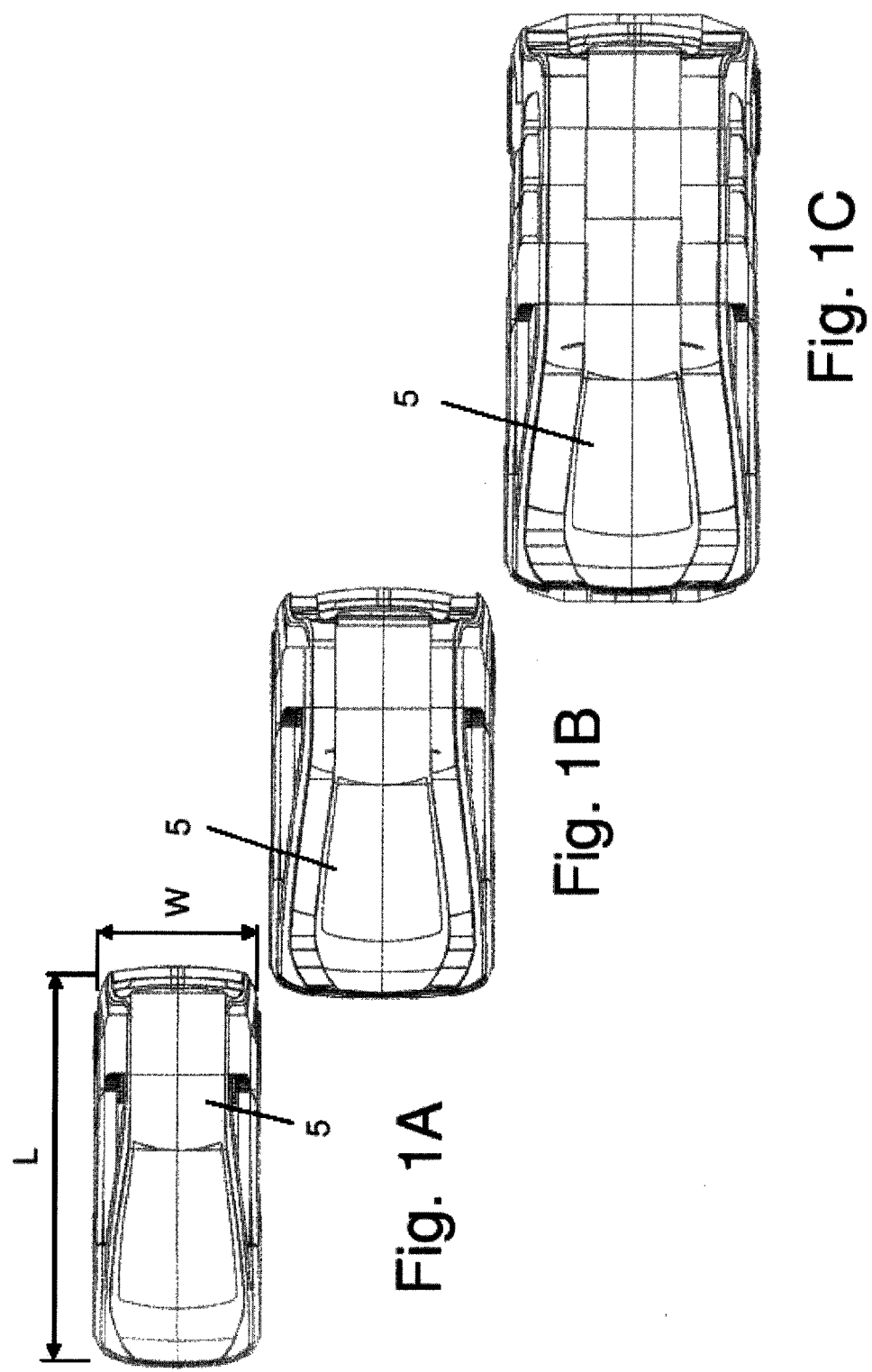

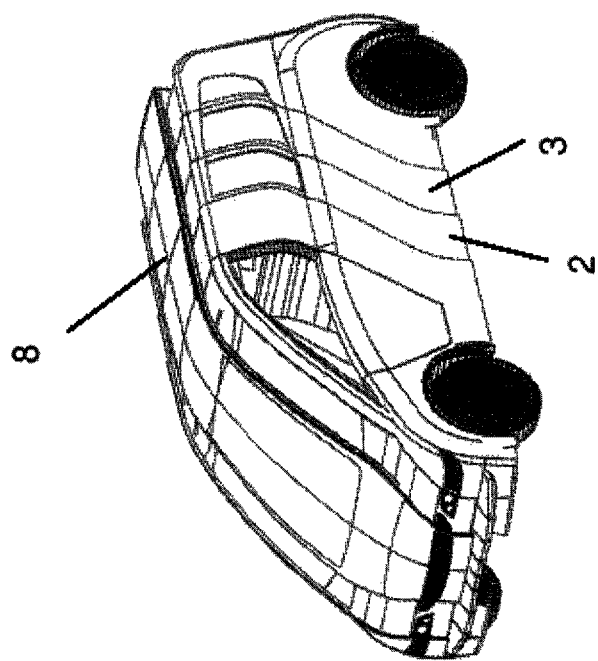
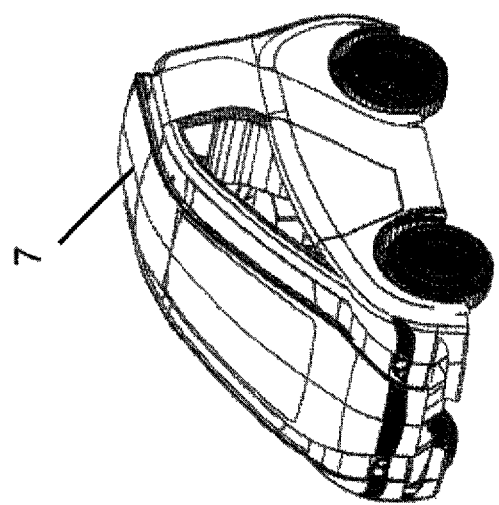
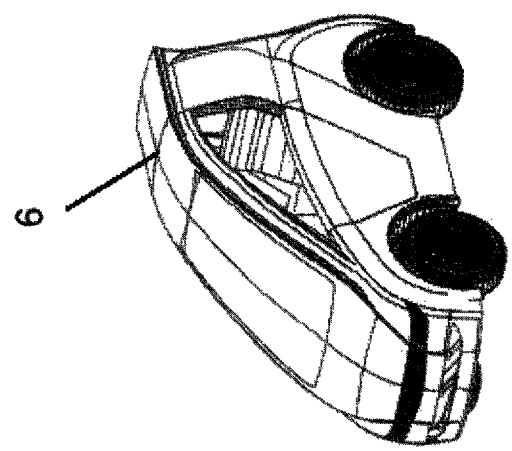

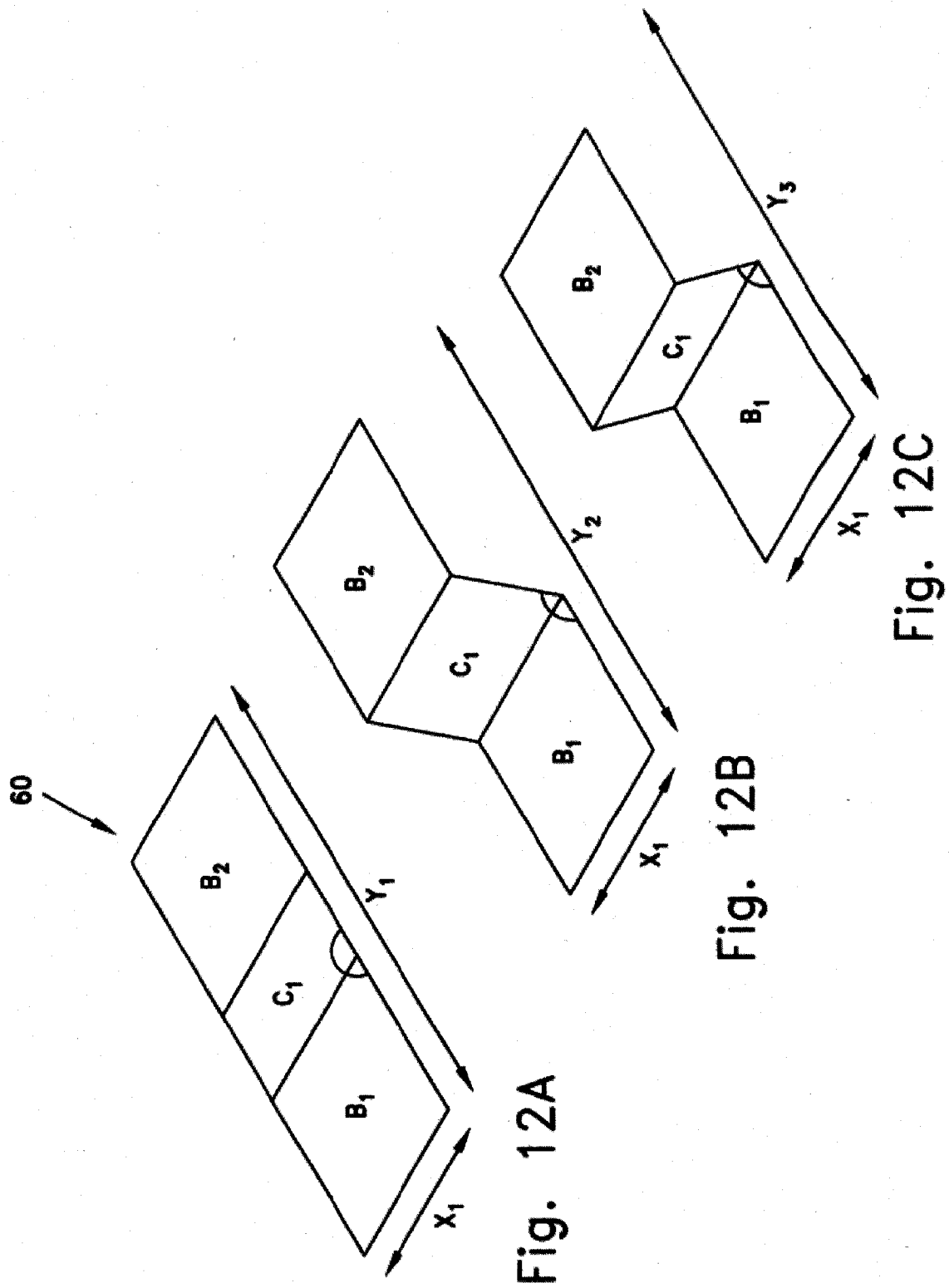

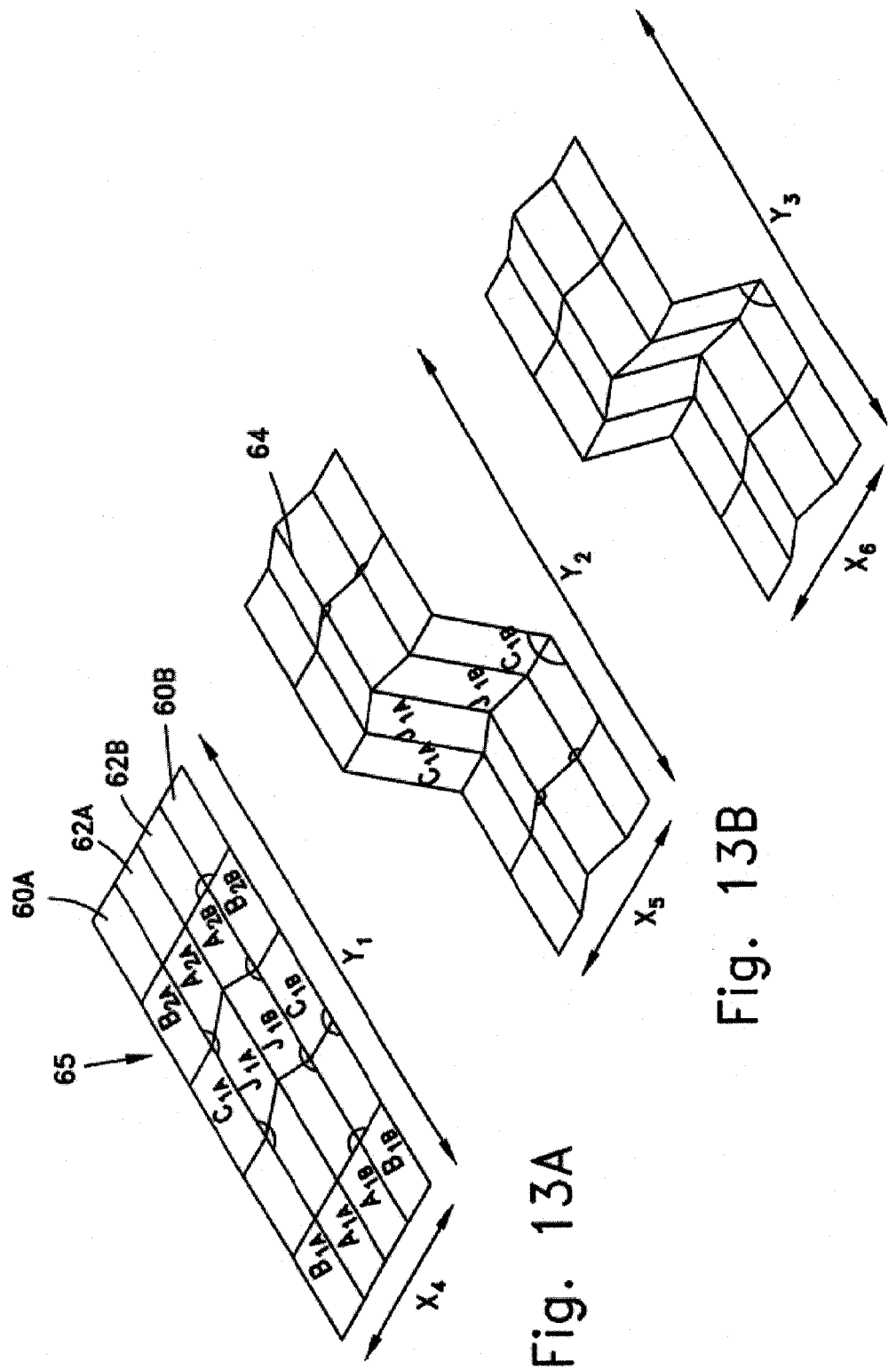

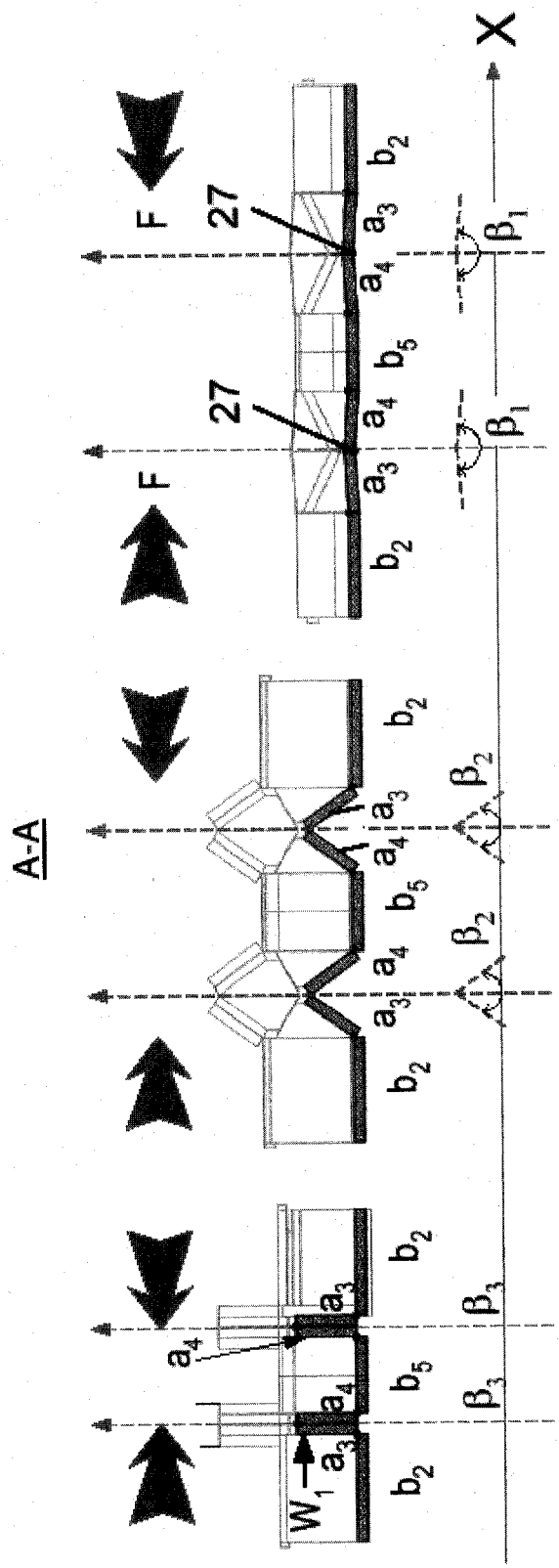

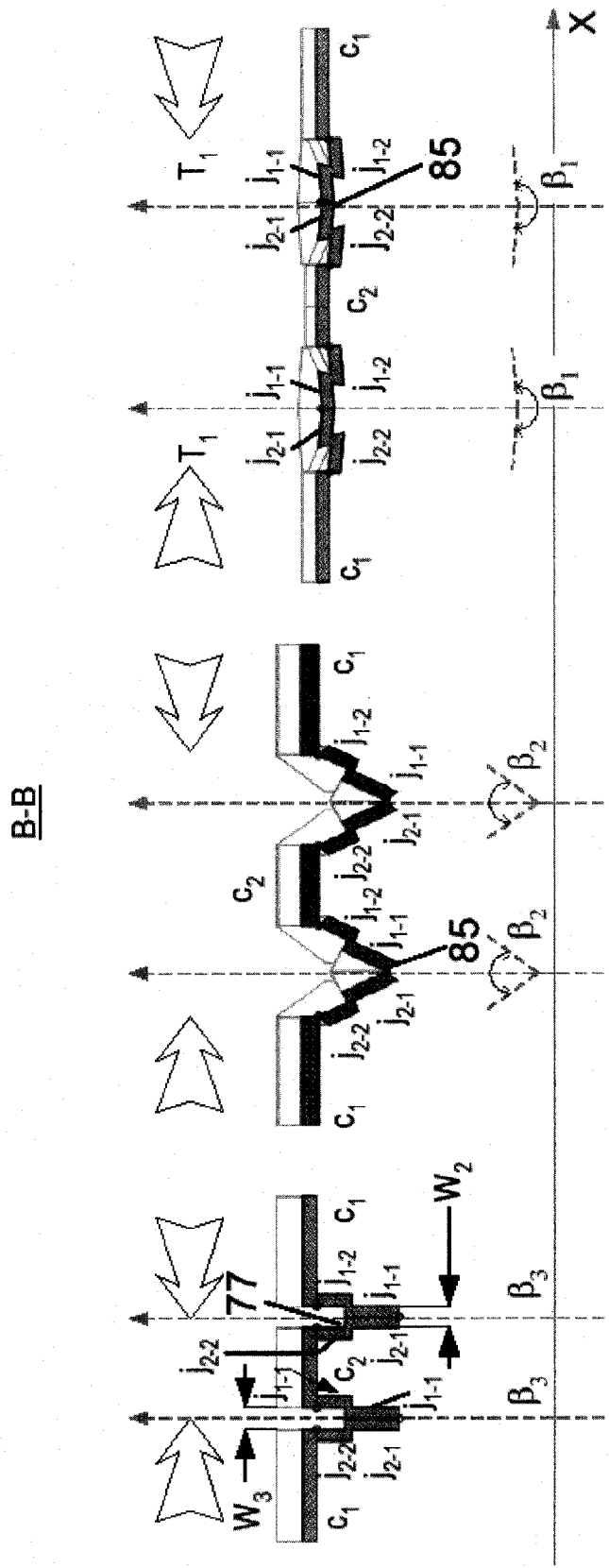

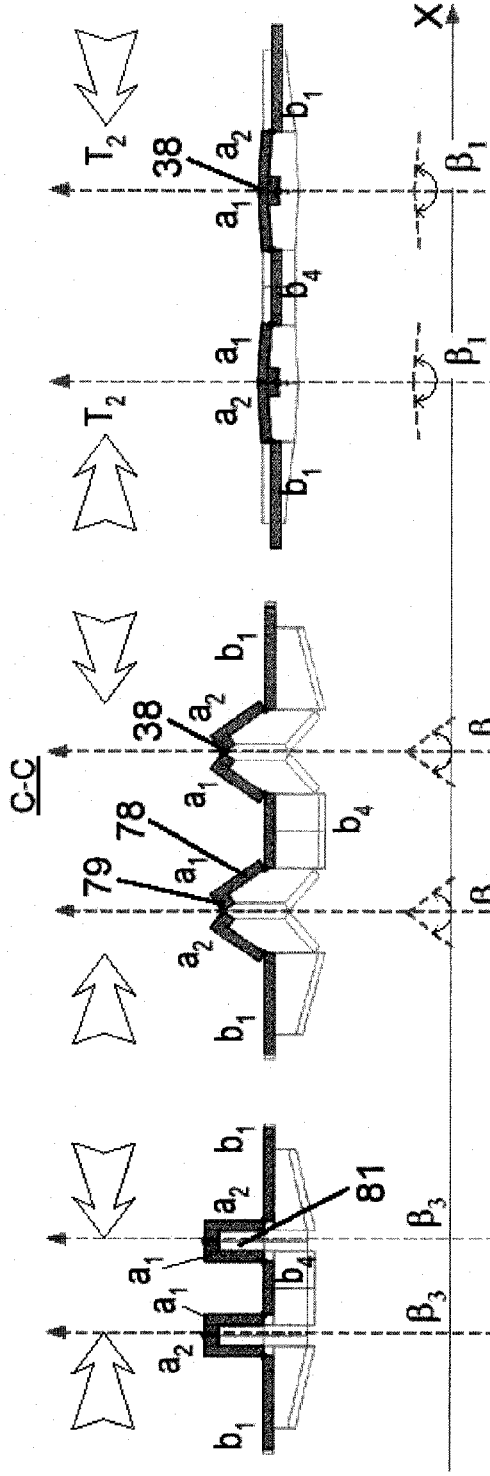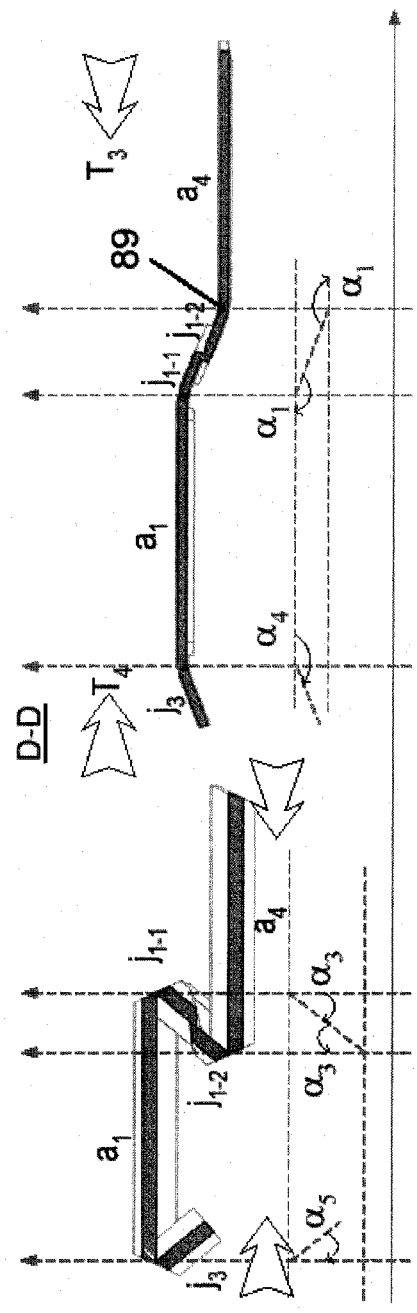

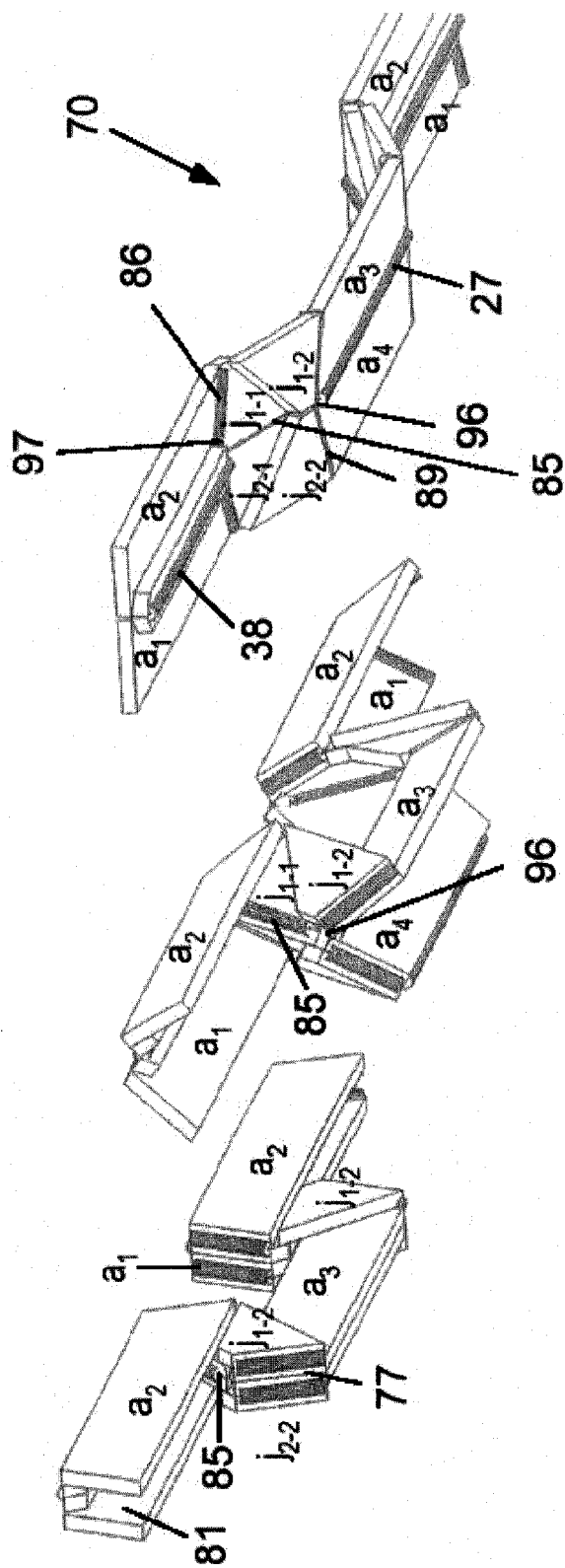

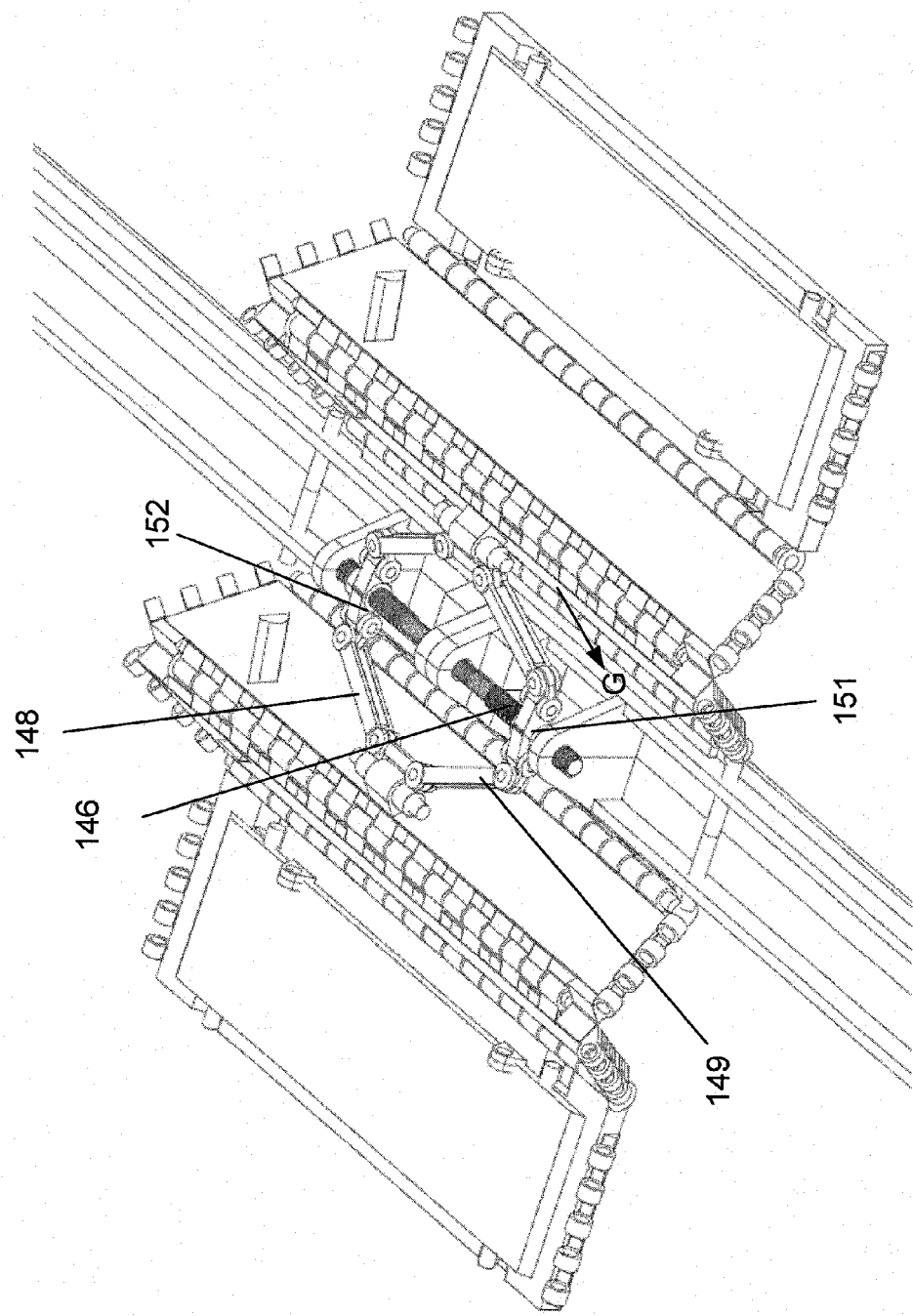

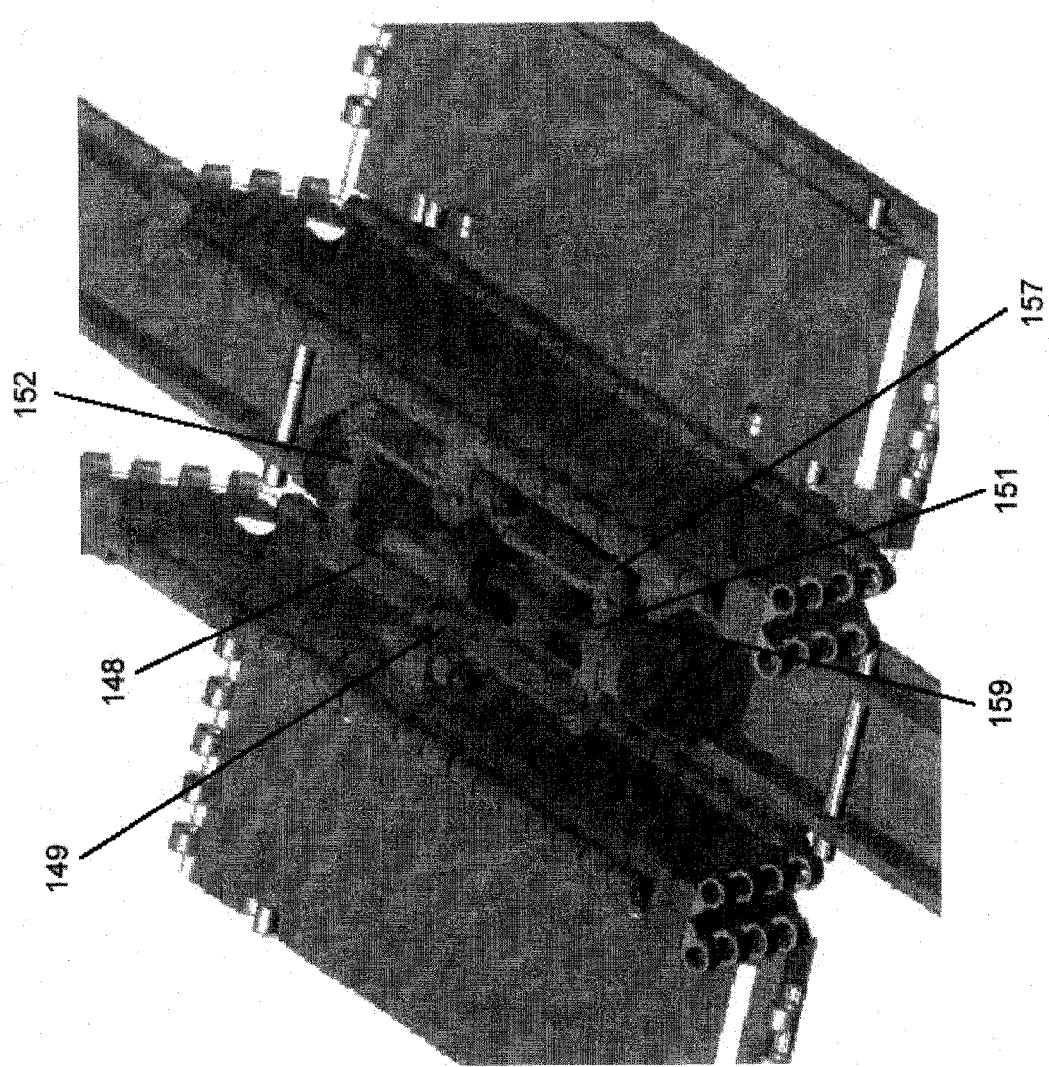

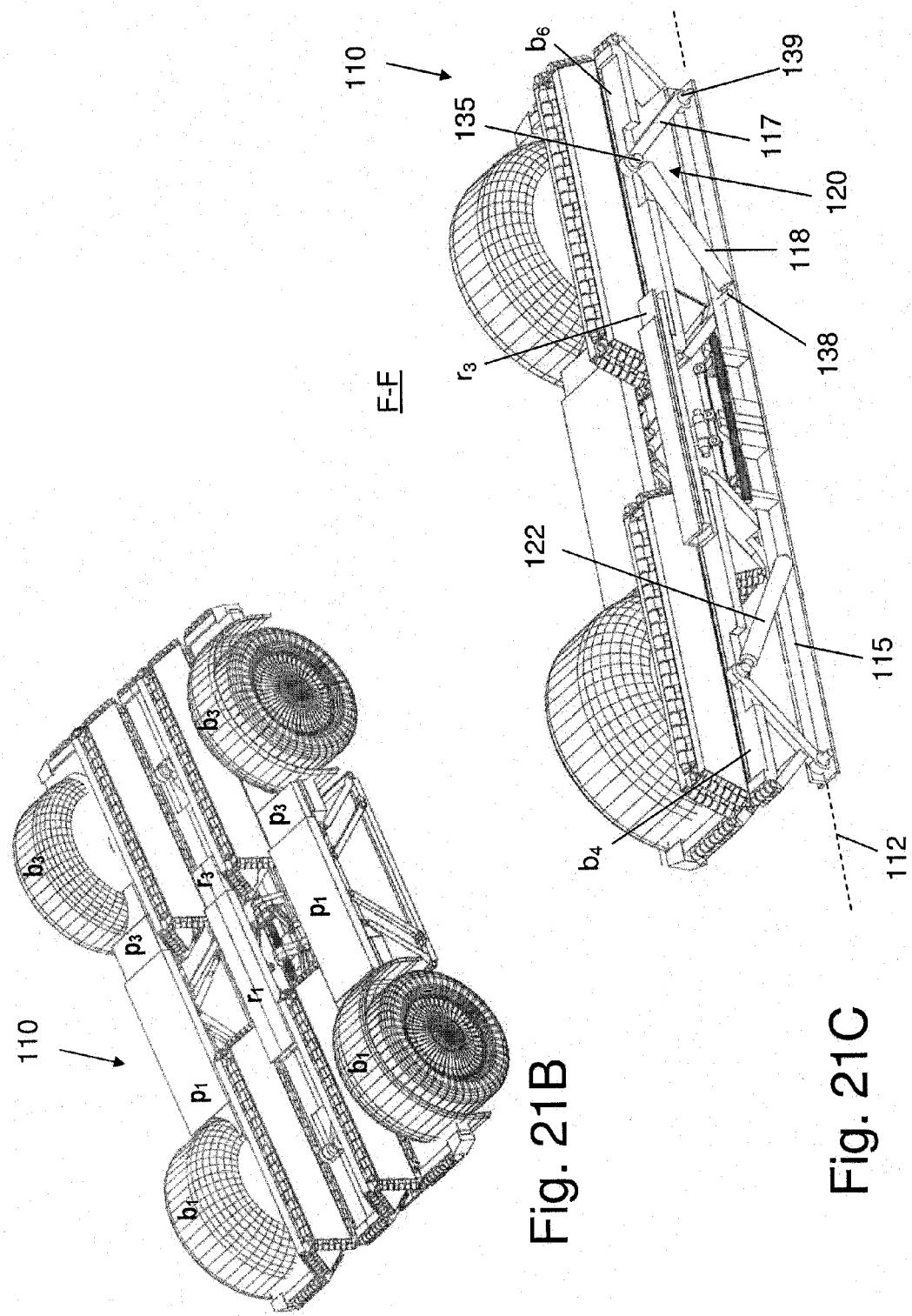

DIMENSIONALLY ADJUSTABLE VEHICLE

CROSS-REFERENCE TO RELATED APPLICATIONS

This application is the U.S. National Stage of International Application No. PCT/IL2012/000045, filed Jan. 26, 2012, which claims priority from Israeli Patent Application No. 211838, filed Mar. 212, 2011. The entire disclosure of each the aforesaid applications is incorporated by reference in the present application.

FIELD OF THE INVENTION

The present invention relates to the field of motor vehicles. More particularly, the invention relates to a dimensionally adjustable vehicle.

BACKGROUND OF THE INVENTION

In many urban settings, parking spaces are not readily available. Drivers spend an excessive amount of time circling around a city block in search of a parking space, particularly if the vehicle being driven seats a relatively large number of passengers, e.g. a van or a sport utility vehicle (SUV), and an available parking spot is smaller than the length of the vehicle.

Although a relatively large sized vehicle is efficient in terms of the number of passengers that can be transported, it presents challenges to traffic and city planners in terms of increased traffic congestion and a lack of suitable parking spaces.

It would therefore be desirable to provide an expandable vehicle which can seat a large number of passengers, yet which can be contracted upon conclusion of a trip so that the reduced size vehicle can be parked at a correspondingly small parking space after the passengers disembark.

JP 5077766 discloses a vehicle that has a contractible body volume. In order to increase or reduce the dimensions of the vehicle, a plurality of protrusions press on the ground by means of a hydraulic jack or an electric motor, causing the wheels to be set off the ground and allowing the dimensions of the vehicle body to be changed. Only one vehicle dimension can be changed at a time. With such an arrangement, an operation for dimensionally adjusting a vehicle is time consuming and complex.

It is an object of the present invention to provide a dimensionally adjustable vehicle, the size of which can be significantly reduced or enlarged upon demand.

It is an additional object of the present invention to provide a dimensionally adjustable vehicle that can be easily and quickly size adjusted upon demand by the driver.

It is an additional object of the present invention to provide a dimensionally adjustable vehicle whose length and width can be simultaneously adjustable.

Other objects and advantages of the invention will become apparent as the description proceeds.

SUMMARY OF THE INVENTION

The present invention provides a dimensionally adjustable vehicle, comprising a platform of pivoting and non-pivoting plates arranged such that the spacing between a pair of said non-pivoting plates is changed to dimensionally adjust said vehicle upon application of an initiating force to a plurality of said pivoting plates which causes a pivoting motion.

As referred to herein, a "plate" is a rigid unit of the platform, on top of which is connected a vehicular seat or a body element of the vehicle. One plate is displaceable relative to another plate or relative to an element of the vehicle, and may be configured as a two-dimensional or three-dimensional unit, whether completely solid, framelike with a solid perimeter and a hollow interior, or provided with an internal cavity surrounded by external walls.

Adjacent pivoting and non-pivoting plates are connected together in such a way to define a platform with a predetermined reduction or enlargement ratio, whether lengthwise (hereinafter "longitudinally") or widthwise (hereinafter laterally"). The relative angular or linear relation of some of the plates changes during a dimension adjusting operation upon application of a force to selected plates by means of a force initiator. Depending on the platform configuration, the platform is synchronously longitudinally and laterally dimensionally adjustable, solely longitudinally dimensionally adjustable, or solely laterally dimensionally adjustable.

The platform is generally divided into sections. The plates of a central section may be located below or above the plates of front and rear sections. Alternatively, all plates of the platform are substantially coplanar when the platform is set to a completely enlarged configuration.

In one aspect, a section of the platform comprises a pair of laterally adjacent and laterally pivoting plates which is interposed between a pair of the non-pivoting plates such that a lateral side of each of said laterally pivoting plates is pivotally connected to a lateral side of an adjacent non-pivoting plate, application of the initiating force to at least one of said pair of laterally adjacent and laterally pivoting plates causing a lateral dimension of the vehicle to be adjusted.

In one aspect, a longitudinally pivoting plate is pivotally connected to a plate in a central section and to a plate in a forward or rear section.

In one aspect, the longitudinally pivoting plate is a jointly pivoting plate that is both laterally pivoting and longitudinally pivoting.

In one aspect, the jointly pivoting plate comprises a protruding plate and a recessed plate that are fixedly connected to, or integrally formed with, each other.

In one aspect, the recessed plate is pivotally connected to a longitudinal side of a laterally pivoting plate in the central section and to a laterally adjacent longitudinally pivoting plate.

In one aspect, the protruding plate is pivotally connected to a laterally adjacent protruding plate and to a longitudinal side of a laterally pivoting plate in the forward or rear section.

In one aspect, the platform further comprises a plurality of longitudinally extendable and contractible plates which are displaceable during a longitudinal adjustment operation.

In one aspect, a first longitudinally extendable plate is connected to a non-pivoting plate in the forward section, a second longitudinally extendable plate is connected to a non-pivoting plate in the rear section, and a third longitudinally extendable plate is interposed between, and telescopingly connected to, said first and second longitudinally extendable plates.

In one aspect, the central section comprises two pairs of laterally pivoting plates and the initiating force is applied simultaneously to two laterally adjacent laterally pivoting plates in the central section.

In one aspect, the jointly pivoting plate is pivotally connected to a laterally pivoting plate in the central section and to a laterally pivoting plate in the forward section or in the rear section, thereby transmitting the initiating force to the laterally pivoting plate in the forward section or in the rear section and causing both a lateral dimension and a longitudinal of the vehicle to be simultaneously adjusted.

In one aspect, the vehicle further comprises a force initiator for applying the initiating force to a plurality of the pivoting plates.

In one aspect, the force initiator is a jack device comprising a linkage which is in force transmitting relation with two laterally spaced laterally pivoting plates, operation of said jack device causing said two plates to be laterally pivoted and the platform to undergo a dimension adjusting operation in response the lateral pivoting of said two plates.

In one aspect, the vehicle further comprises a support beam located below all plates of the platform and two stabilizing units for stabilizing the platform upon conclusion of a dimension adjusting operation, said two stabilizing units being pivotally connected to said beam and to a non-pivoting plate in the front and rear sections, respectively.

In one aspect, the vehicle further comprises means for reorientating one or more seat assemblies during a dimension adjusting operation.

In one aspect, the laterally pivoting plates are trapezoidal, symmetrical, and elongated.

BRIEF DESCRIPTION OF THE DRAWINGS

In the drawings:

FIGS. 1A-C are three top views, respectively, of a vehicle which is dimensionally adjusted from a reduced size configuration to an enlarged size configuration;

FIGS. 2A-C are three perspective views, respectively, of a vehicle which is dimensionally adjusted from a reduced size configuration to an enlarged size configuration;

FIGS. 12A-C schematically illustrate one type of pivotal movement made possible with a first group of pivotally interconnected plates;

FIGS. 13A-C schematically illustrate another type of pivotal movement made possible with a second group of pivotally interconnected plates;

FIGS. 14A-C are three lateral cross sections, respectively, of a central section of the platform cut about plane A-A of FIG. 9 while undergoing a first step of a vehicle dimension adjusting operation from a fully expanded configuration to a fully contracted configuration;

FIGS. 15A-C are three lateral cross sections, respectively, of a group of plates of the platform that includes a plurality of jointly pivoting parallelogram pairs, cut about plane B-B of FIG. 9, while undergoing another step of a vehicle dimension adjusting operation caused by the steps of FIG. 14A-C from a fully expanded configuration to a fully contracted configuration;

FIGS. 16A-C are three lateral cross sections, respectively, of a group of plates of the platform that includes a plurality of laterally pivoting trapezoidal pairs, cut about plane C-C of FIG. 9, while undergoing another step of a vehicle dimension adjusting operation caused by the steps of FIG. 15A-C from a fully expanded configuration to a fully contracted configuration;

FIGS. 17A-B are two longitudinal cross sections, respectively, of the forward and central sections of the platform, cut about plane D-D of FIG. 9, while undergoing another step of a vehicle dimension adjusting operation caused by the steps of FIG. 14A-C and 16A-C from a fully expanded configuration to a fully contracted configuration;

FIGS. 18A-C are three perspective views, respectively, from the side and bottom of a group of plates from the forward, central and rear sections of the platform of FIG. 8, showing some plates that are received in a cavity formed between other plates when dimensionally adjusted from a fully expanded configuration to a fully contracted configuration;

FIGS. 20A-C illustrate a dimension adjusting operation in perspective view which is carried out by means of a jack device according to one embodiment of the invention, from a fully expanded configuration to a fully contracted configuration;

FIG. 21B is a perspective view from the top of the platform of FIG. 21A, shown in an intermediate size configuration;

FIG. 21C is a perspective, cross sectional view from the side of the platform of FIG. 21A, cut about plane F-F of FIG. 21A while shown in a fully contracted configuration;

DETAILED DESCRIPTION OF PREFERRED EMBODIMENTS

Figure 3:
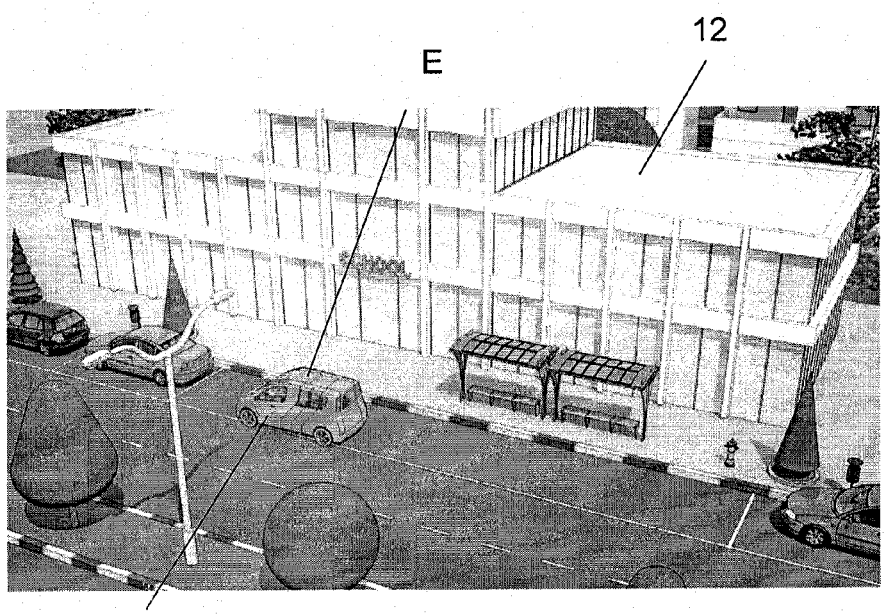
FIG. 3 illustrates a dimensionally adjustable vehicle which is set to an enlarged size configuration.

The present invention is a novel dimensionally adjustable vehicle that can be dimensionally adjusted both lengthwise and widthwise simultaneously, whether while being stationary or in transit.

FIGS. 1A-C illustrate three top views, respectively, of a vehicle 5 which is dimensionally adjusted from a reduced size configuration in FIG. 1A to an enlarged size configuration in FIG. 1C wherein both its length L and width W become enlarged. FIGS. 2A-C illustrate three perspective views, respectively, of a vehicle when dimensionally adjusted from a reduced size configuration 6, to an intermediate size configuration 7, and then to an enlarged size configuration 8. Various vehicle body members, such as elements 2 and 3, are telescopingly expandable and contractible, whether lengthwise or widthwise, during a dimension adjusting operation.

Figure 4A:
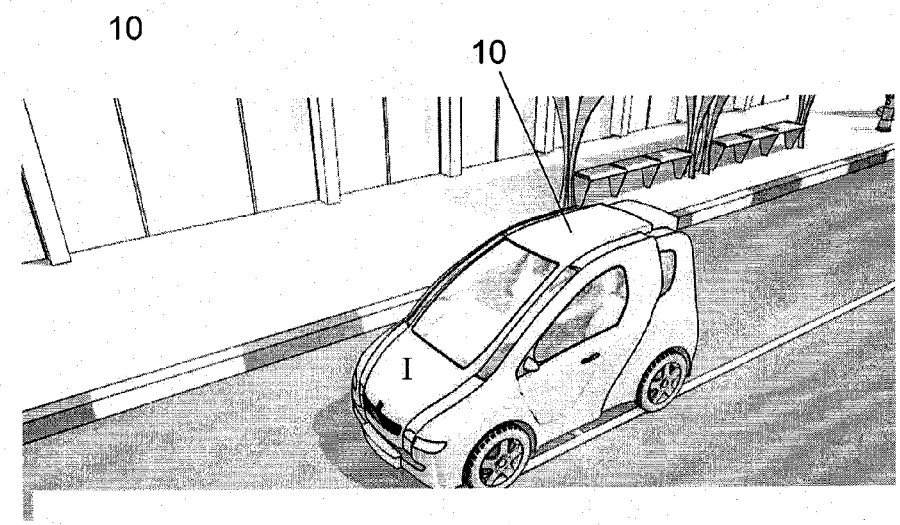
FIGS. 4A and 4B illustrates the vehicle of FIG. 3 when set to an intermediate and reduced sized configuration, respectively.
Figure 4B:
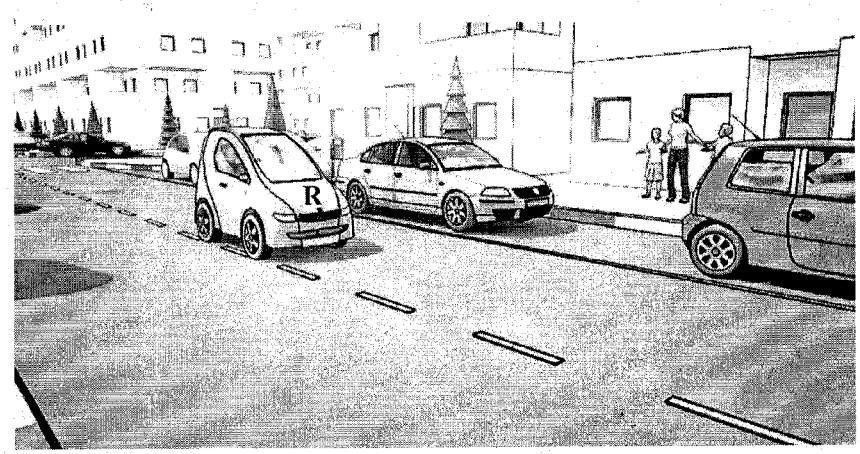
Figure 5:
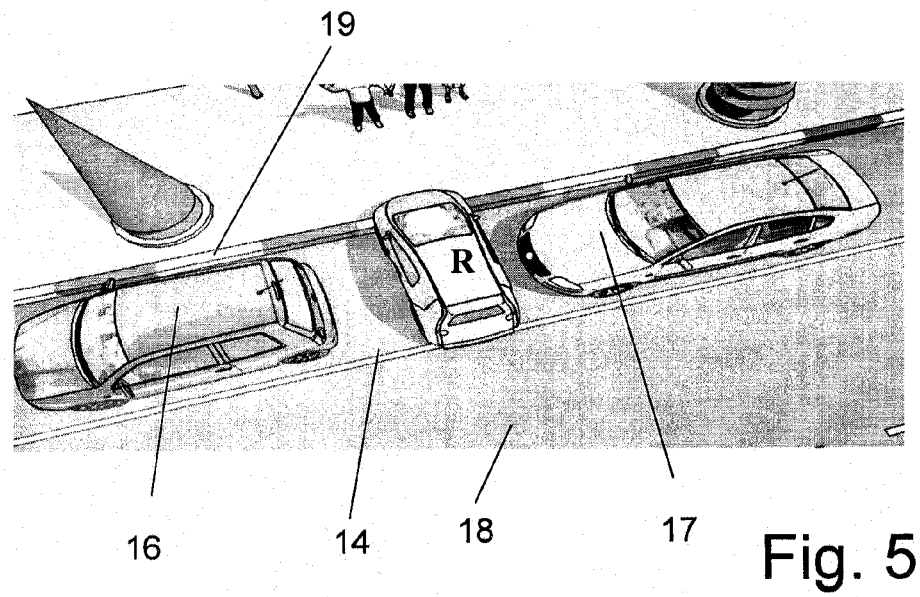
FIGS. 5 and 6 illustrate two parking spots, respectively, that are available for the reduced size vehicle of FIG. 4B.
Figure 6:
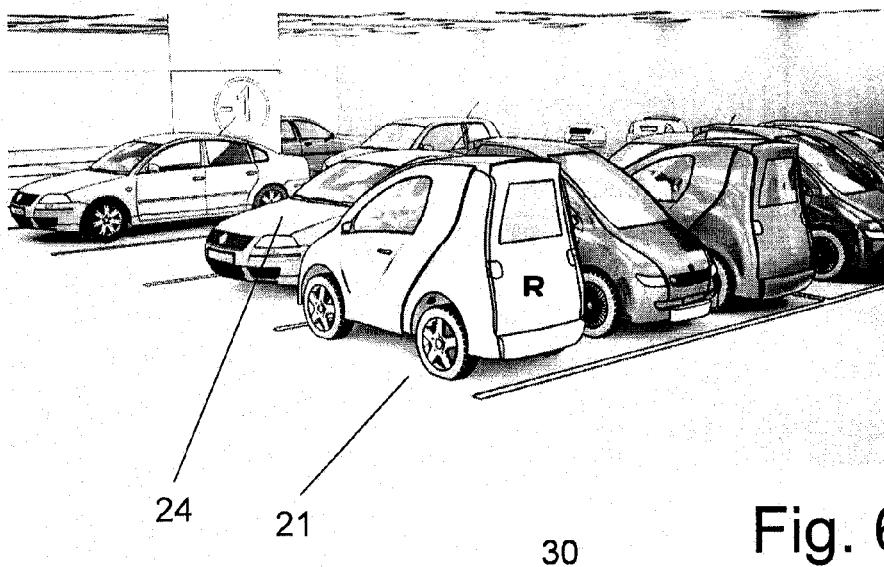

The ability to significantly dimensionally reduce the size of a vehicle, e.g. from an enlarged size configuration of 397 cm×175 cm to an intermediate size configuration of 290 cm×140 cm or to a reduced size configuration of 260 cm×112 cm, enables driving conditions that have not been envisioned heretofore. It will be appreciated that any other vehicle size reduction or enlargement ratio is within the scope of the invention As shown in FIG. 3, a vehicle 10 set at an enlarged size configuration E may be driven in a conventional method, for example to drive a group of children to a school 12. After the passengers leave, the vehicle 10 may be set to an intermediate size configuration I, as shown in FIG. 4A, or alternatively to a reduced size configuration R, as shown in FIG. 4B, while the driver remains in the vehicle and even when the vehicle is in transit. The reduced size vehicle R may be parked in a space which is generally too small for normally sized vehicles, for example a space 14 of approximately half a car length between two vehicles 16 and 17 parked parallel to a curb 19 while the vehicle is parked substantially perpendicular to the curb without protruding into road 18, as shown in FIG. 5, or alternatively, a space 21 in a parking lot which is designated for reduced size vehicles while being parked widthwise in the space and substantially perpendicular to other normally sized vehicles 24, as shown in FIG. 6. Three reduced sized vehicles R can be parked widthwise in a space 21 in which only one normally sized vehicle 24 can be generally parked.

Figure 7:
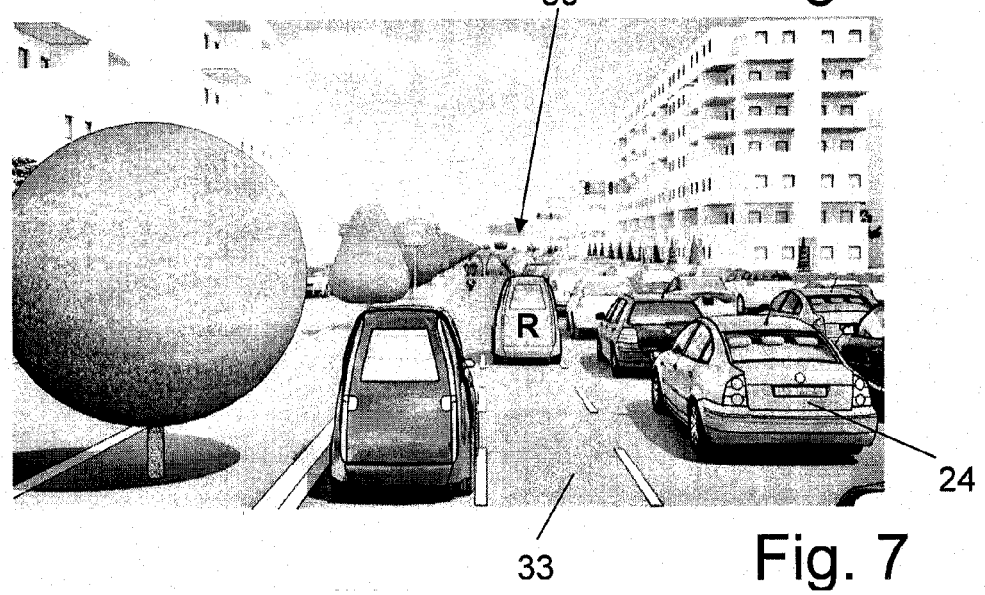
FIG. 7 illustrates a road layout that can accommodate a plurality of reduced size vehicles of FIG. 4B.

By virtue of the reduced size vehicles R of the present invention, traffic planners may revolutionize road layouts for both intercity roads and for highways. Heretofore, all lanes of a road have been designed to be of a substantially uniform width, e.g. 3.3 m, in order to accommodate wide vehicles such as buses. As shown in FIG. 7, a multi-lane road system 30 may include a plurality of normally sized lanes 31 for use of normally sized vehicles 24, and a plurality of relatively narrow lanes 33, e.g. half the width of normally sized lanes 31, over which reduced size vehicles R travel. The provision of a multi-lane road system 30 with relatively narrow lanes 33 will increase its vehicular capacity, i.e. the number of vehicles that traverse the multi-lane road system at a given time, thereby dramatically reducing traffic congestion. A reduced size vehicle R may travel in either a normally sized lane 31 or in a relatively narrow lane 33, depending on a desired vehicular speed or on the traffic flow of a given lane. As the vehicle is dimensionally adjustable while in transit, a driver may decide to reduce the width of the vehicle and to change lanes to a relatively narrow lane 33 if traffic is flowing faster in the relatively narrow lane.

An additional advantage of multi-lane road system 30 that employs a plurality of relatively narrow lanes is increased safety for two wheeled vehicles, such as a motorcycle or bicycle, traveling in the same lane as a reduced size four wheel vehicle.

In order to dimensionally adjust the vehicle, the vehicle comprises a plurality of interconnected rigid incompressible plates (hereinafter the "platform"), on top of some of which are connected seats of the vehicle and on top of others are connected body elements of the vehicle. Upon application of a force to selected plates by means of a jack device, as will be described hereinafter, the angular relation of the plates changes, causing a synchronous lengthwise and widthwise contraction, or a synchronous lengthwise and widthwise expansion, of the platform.

Figure 8:
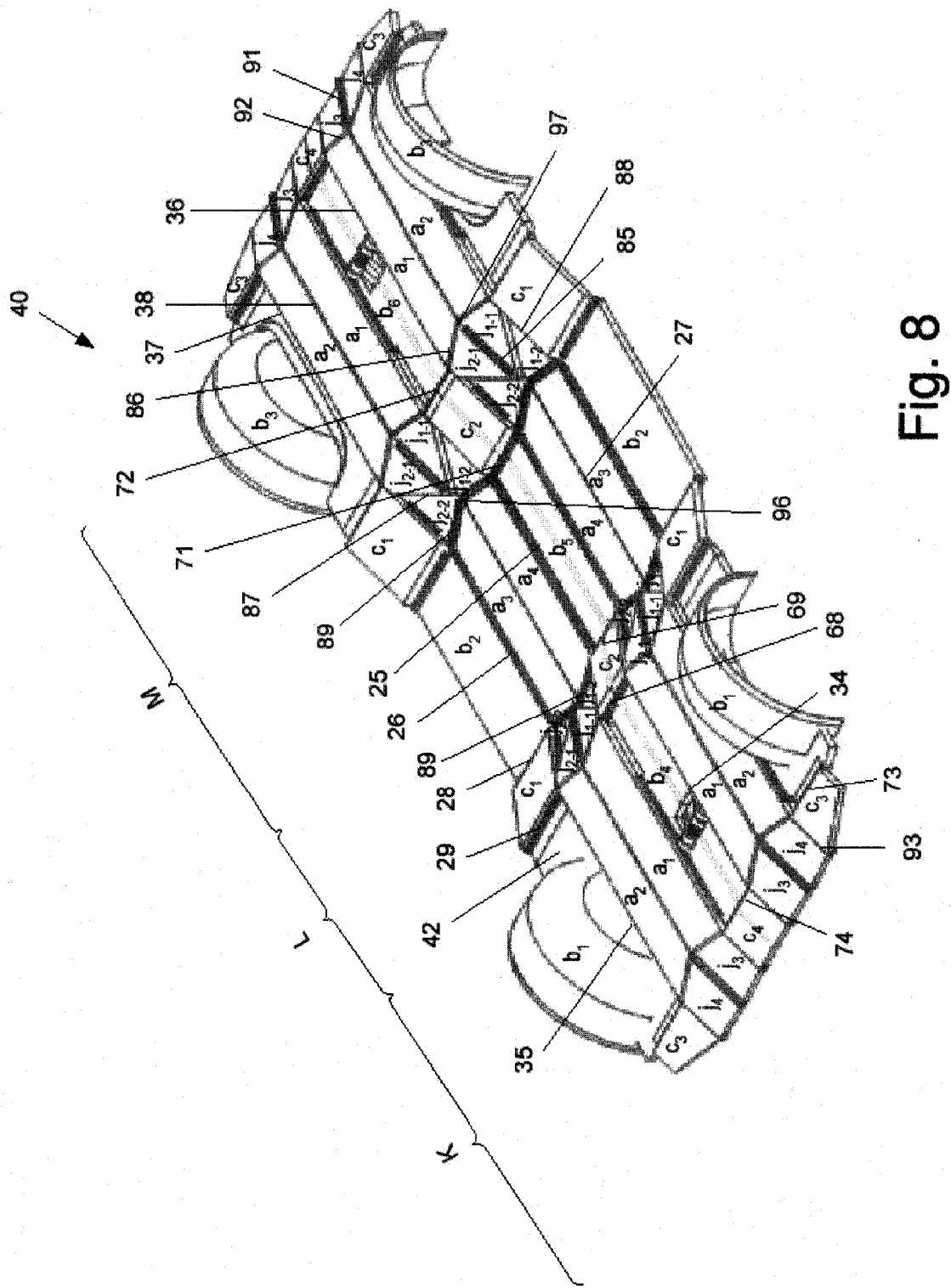
FIG. 8 is a perspective view of a platform of a dimensionally adjustable vehicle which is set to an enlarged size configuration, according to one embodiment of the present invention.
Figure 9:
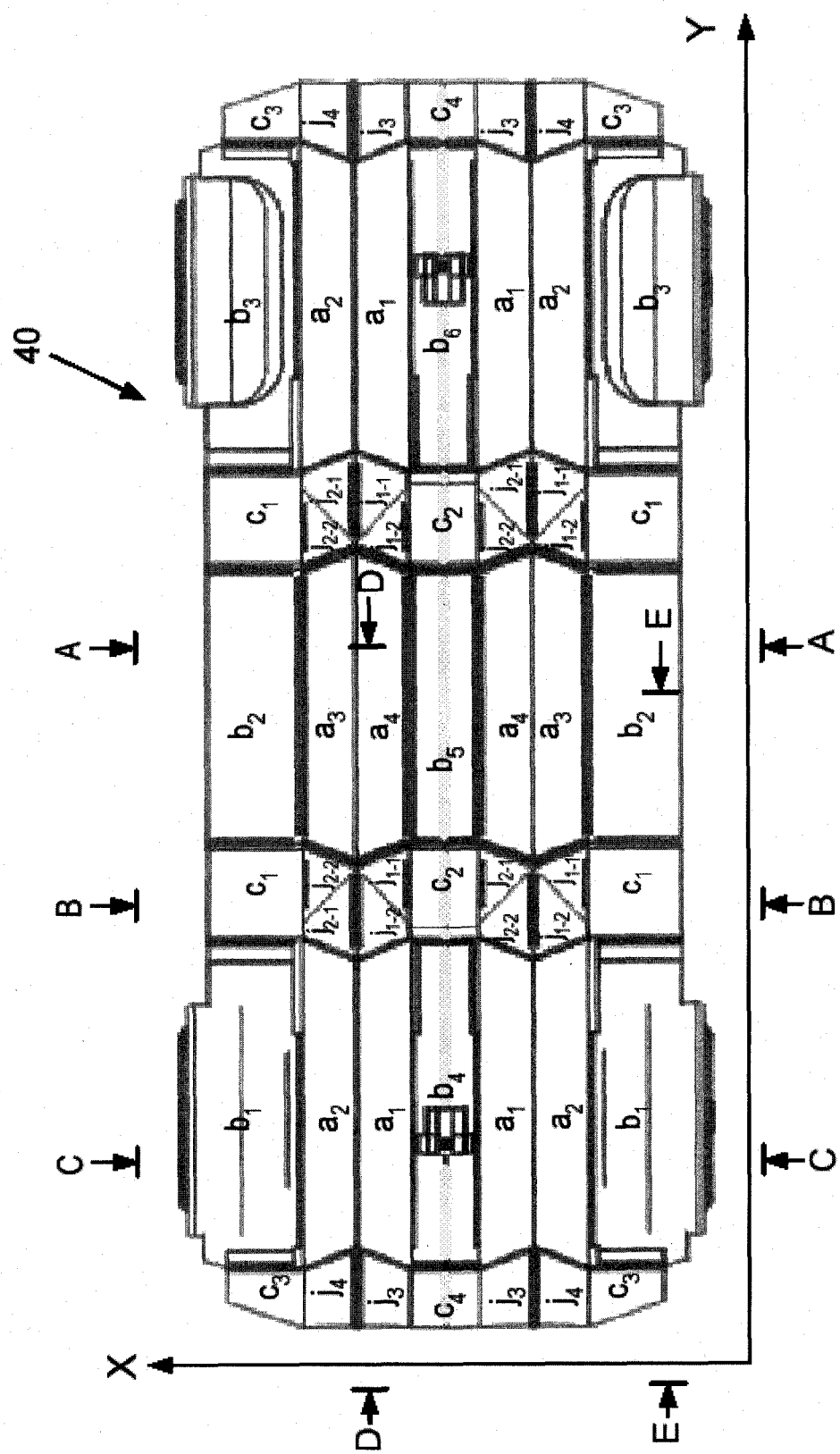
FIG. 9 is a plan view of the platform of FIG. 8.

FIGS. 8 and 9 illustrate a platform 40 set to an enlarged size configuration, according to one embodiment of the invention. FIG. 8 illustrates a perspective view of the platform while FIG. 9 illustrates a plan view of the platform. Platform 40 has a symmetrical forward section K and a rear section M, and a central section L interposed between, and located below, the forward and rear sections.

Most of the elements of platform 40 are pivotable, with the exception of elements $b_{1-6}$. Elements $b_1$ and $b_3$ are non-pivoting convex wheel protectors provided with a planar portion 42 adjacent to the convex portion, to which an adjacent plate is pivotally connected. The remaining elements of platform 40 are polygonal plates. The non-pivoting plates on which no moments are acting are elongated rectangular plates that are horizontally disposed, including two plates $b_2$, each one centrally located longitudinally between a forward wheel protector $b_1$ and a rear wheel protector $b_3$, at each lateral end of the platform, a plate $b_4$ centrally located laterally between a pair of forward wheel protectors $b_1$, a plate $b_5$ centrally located laterally between a pair of plates $b_2$, and a plate $b_6$ centrally located laterally between a pair of rear wheel protectors $b_3$. The three plates $b_{4-6}$ are longitudinally aligned when platform 40 is in an enlarged size configuration. It will be appreciated that although elements $b_{1-6}$ are non-pivotable, they are nevertheless longitudinally and laterally displaceable when a suitable force is applied thereto by an interconnected plate.

Figure 10:
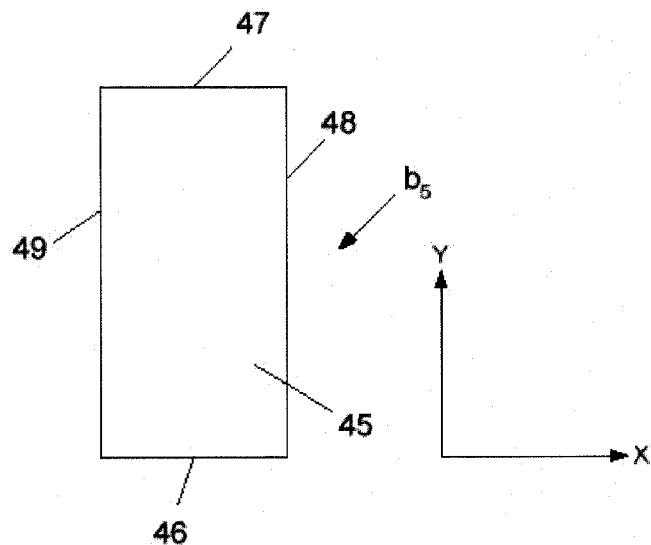
FIG. 10 is a plan view of a non-pivoting plate of the platform of FIG. 8, showing how it serves as a reference plane.

As shown in FIG. 10, the upper surface 45 of one of the non-pivoting plates, e.g. plate $b_5$ will serve as a reference plane for the pivoting action of the other plates. As plate $b_5$ is non-pivoting, a plate pivotally connected to one of the longitudinal, i.e. lengthwise, ends 46 and 47 of plate $b_5$ will pivot about an axis that is parallel to the X-axis, and will therefore be called a "longitudinally pivoting plate" since it pivots only in a longitudinal direction but not in a lateral direction, i.e. along the X-axis, relative to the reference plane. A plate pivotally connected to one of the lateral ends 48 and 49 of plate $b_5$ will pivot about an axis that is parallel to the Y-axis, and will therefore be called a "laterally pivoting plate" since it pivots only in a lateral direction but not in a longitudinal direction relative to the reference plane. A plate pivotally connected to both a longitudinally pivoting plate and a laterally pivoting plate will be called a "jointly pivoting plate".

Referring back to FIGS. 8 and 9, each of four pairs of laterally adjacent and symmetrical, trapezoidal elongated laterally pivoting plates $a_{1-2}$ is pivotally connected by connection 34 to plate $b_4$ and by connection 35 to a corresponding forward wheel protector $b_1$, or by connection 36 to plate $b_6$ and by connection 37 to a corresponding rear wheel protector $b_3$. In each pair, plate $a_1$ is pivotally connected by connection 38 to plate $a_2$, the common pivotal connection being shorter than the side of the trapezoidal plate parallel thereto. Each of a pair of laterally adjacent and symmetrical, trapezoidal elongated laterally pivoting plates $a_{3-4}$ is pivotally connected by connection 25 to plate $b_5$ and by connection 26 to a corresponding plate $b_2$. In each pair, plate $a_3$ is pivotally connected by connection 27 to plate $a_4$, the common pivotal connection being longer than the side of the trapezoidal plate parallel thereto.

Each of four squarelike, longitudinally pivoting plates $c_1$ is pivotally connected by connection 28 to one longitudinal end of non-pivoting plate $b_2$ and by connection 29 to a corresponding wheel protector. One squarelike, longitudinally pivoting plate $c_2$ is pivotally connected by connection 68 to one longitudinal end of plate $b_4$ and by connection 69 to plate $b_5$, and another longitudinally pivoting plate $c_2$ is pivotally connected by connection 71 to one longitudinal end of plate $b_5$ and by connection 72 to plate $b_6$. Each of four trapezoidal, longitudinally pivoting plates $c_3$ is pivotally connected by connection 73 to the outer longitudinal end of a corresponding wheel protector. One squarelike, longitudinally pivoting plate $c_4$ is pivotally connected by connection 74 to the outer longitudinal end of plate $b_4$ and the other is pivotally connected by connection 75 to the outer longitudinal end of plate $b_6$.

Platform 40 also comprises a plurality of jointly pivoting plates. Some of the jointly pivoting plates protrude with respect to an adjacent jointly pivoting plate and may be called a "protruding plate", and some of the jointly pivoting plates are recessed with respect to an adjacent squarelike plate and may be called a "recessed plate". There are four pairs of symmetrical and laterally adjacent triangular, jointly pivoting protruding plates $j_{1-1}$ and $j_{2-1}$. In each pair of protruding plates, plate $j_{1-1}$ is pivotally connected by connection 85 to plate $j_{2-1}$, the common pivotal connection being the longest side of the triangular plate. One side of each of plates $j_{1-1}$ and $j_{2-1}$ is pivotally connected by connection 86 to the longitudinal inner side of laterally pivoting plates $a_1$ and $a_2$, respectively. The third side of each of plates $j_{1-1}$ and $j_{2-1}$ is fixedly connected by connection 87 to triangular recessed plates $j_{1-2}$ and $j_{2-2}$, respectively. A pair of a protruding plate and a recessed plate fixedly connected together defines a parallelogram which may be called a "jointly pivoting parallelogram pair" or in brief a "parallelogram pair".

The long side of triangular jointly pivoting recessed plates $j_{1-2}$ and $j_{2-2}$ is pivotally connected by connection 88 to the adjacent side of a squarelike longitudinally pivoting plate. The remaining side of recessed plates $j_{1-2}$ and $j_{2-2}$ is pivotally connected by connection 89 to a longitudinal side of a corresponding trapezoidal laterally pivoting plate located within central section L. A pair of the laterally adjacent, triangular recessed plates $j_{1-2}$ and $j_{2-2}$ are pivotally connected together at an apical portion which adjoins the longitudinal end of the common pivotal connection of trapezoidal plates $a_{3-4}$. A short portion of the side of a squarelike plate which is not pivotally connected to a recessed plate is pivotally connected to a protruding plate.

There are two pairs of laterally adjacent trapezoidal jointly pivoting plates $j_{3-4}$ at each longitudinal end of platform 40. Each of plates $j_3$ and $j_4$ is pivotally connected by connection 91 to each other, by connection 92 to the outer longitudinal side of a corresponding pair of trapezoidal laterally pivoting plates $a_1$ and $a_2$, respectively, and by connection 93 to the side of the laterally adjacent longitudinally pivoting plate.

It will be appreciated that although platform 40 is shown in FIG. 8 to be set to an enlarged size configuration, the various sections thereof are nevertheless not completely flat. Adjacent plates are biased to be slightly angularly displaced from the reference plane when platform is set to an enlarged size configuration to reduce the force needed to cause a plate to pivot.

Figure 11:
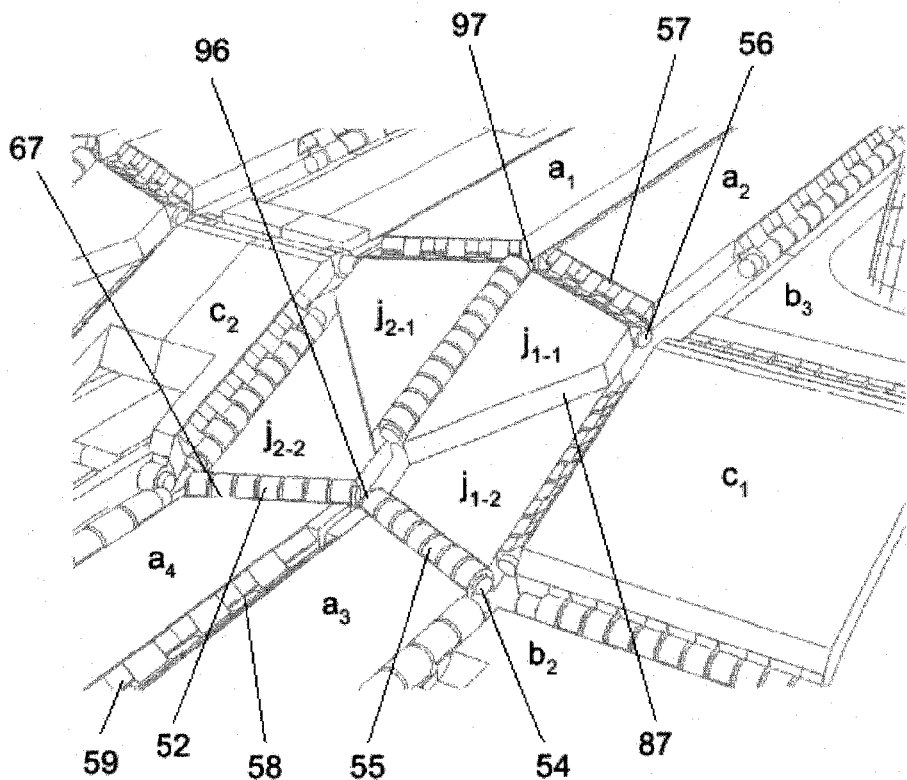
FIG. 11 is a perspective view from the top of a portion of the platform of FIG. 8, illustrating exemplary pivotal connections thereof.

FIG. 11 shows a portion of the platform, illustrating exemplary pivotal connections. A butt hinge 52 is shown to pivotally connect pairs of adjacent plates by means of a plurality of loops 55 rotatably mounted about a shaft 54 which are alternately connected to the first and second pivotally connected plates of a pair, including plates $a_4$ and $j_{2-2}$, $a_3$ and $j_{1-2}$, $b_2$ and $c_1$, $j_{1-1}$ and $j_{2-1}$, and $a_3$ and $b_2$. A limiter hinge 57 is shown to pivotally connect pairs of adjacent plates by means of a plurality of segments 58 rotatably mounted about a shaft 56 which are alternately connected to the first and second pivotally connected plates of a pair, including plates $a_3$ and $a_4$, $a_2$ and $j_{1-1}$, and $a_1$ and $j_{2-1}$. The angular movement of the plates in a direction which results in an enlarged size configuration is limited by contact between a segment 58 and a sidewall portion 59 of the plate to which the segment is not connected. It will be appreciated that other types of pivotal connections may also be employed.

FIGS. 12A-C schematically illustrate one type of pivotal movement made possible with a group 60 of pivotally interconnected plates. Group 60 is shown to comprise longitudinally pivoting plate $C_1$ longitudinally interposed between non-pivoting plates $B_1$ and $B_2$. In FIG. 12A, group 60 is shown to be in an enlarged size configuration such that its longitudinal dimension is $Y_1$. After application of a force which causes plate B2 to be longitudinally displaced with respect to plate $B_1$, plate $C_1$ is caused to be continuously longitudinally pivoted towards plate $B_1$ such that the longitudinal dimension of group 60 becomes reduced to $Y_2$ in FIG. 12B and then to $Y_3$ in FIG. 12C. In all three configurations of FIGS. 12A-C, the lateral dimension of group 60 remains $X_1$.

FIGS. 13A-C schematically illustrate a second type of pivotal movement made possible with a group 65 of pivotally interconnected plates. Group 65 is shown to comprise two laterally spaced groups 60A and 60B and a pair of laterally adjacent groups 62A and 62B which are interposed between the groups 60A and 60B. Each group is pivotally connected to a laterally adjacent group. Each of the groups 62A and 62B comprises two laterally pivoting trapezoidal plates and a jointly pivoting plate interposed between, and longitudinally pivotally connected to, the two laterally pivoting plates. For example, group 62A comprises laterally pivoting plates $A_{1A}$ and $A_{2A}$ and jointly pivoting plate $J_{1A}$. In FIG. 12A, group 65 is shown to be in an enlarged size configuration such that its longitudinal dimension is $Y_1$ and its lateral dimension is $X_4$. After application of a force for initiating a vehicle dimension adjusting operation (hereinafter an "initiating force"), the plates of each of two pairs of laterally pivoting plates $A_{1-2A}$ and $A_{1-2B}$ laterally pivot in unison, in opposite rotational directions, causing the common pivotal connection 64 to be vertically displaced. Thus as shown in FIG. 13B, upon application of a contraction initiating force, the common pivotal connection 64 of each of the two pairs rises, causing a pair of corresponding longitudinally pivoting plates $B_A$ and $B_B$ to be laterally displaced towards each other, reducing the lateral dimension of group 65 to. $X_5$. The force resulting from the simultaneous laterally pivoting action of plates $A_{1-2A}$ and $A_{1-2B}$ causes jointly pivoting plates $J_{1A-B}$ to be both longitudinally and laterally pivoted, and then in turn plates $C_{1A-B}$ to be longitudinally pivoted. The pivoting action of plates $J_{1A-B}$ and $C_{1A-B}$ causes the longitudinal dimension of group 65 to be reduced to $Y_2$. Upon continuous application of the initiating force as shown in FIG. 13C, group 65 is set to a reduced size configuration corresponding to dimensions of $X_6$ and $Y_3$.

FIGS. 14-19 illustrate a more detailed explanation of a vehicle dimension adjusting operation while referring to a cross section of platform 40 (FIGS. 8-9).

FIGS. 14A-C illustrate a lateral cross section of central section L of the platform while undergoing a first step of a vehicle dimension adjusting operation from a fully expanded configuration to a fully contracted configuration. The plates of central section L are substantially coplanar when set to a fully expanded configuration. The initiating force F acts on each common pivotal connection 27 of the two pairs of laterally pivoting plates $a_3$ and $a_4$ so that the angle β between adjacent plates $a_3$ and $a_4$ and coinciding with a vertical plane parallel to the X axis continuously decreases from $β_1$ to $β_2$ to an angle $β_3$ of 0 at a fully contracted configuration when the adjacent laterally pivoting plates are in contact with each other. The total width of plates $a_3$ and $a_4$ when in contact with each other is $W_1$. The lateral distance between spaced non-pivoting plates $b_2$ and $b_5$ correspondingly decreases while angle β decreases as a result of the force applied from a laterally pivoting plate to the non-pivoting plate connected therewith.

Since each of plates $a_3$ and $a_4$ is pivotally connected to a corresponding parallelogram pair, the laterally pivoting motion of plates $a_3$ and $a_4$ causes a corresponding laterally pivoting motion of the corresponding parallelogram pairs.

FIGS. 15A-C illustrate a lateral cross section of a group of plates that includes, in consecutive order, plates $c_1$, $j_{1-2}$, $j_{1-1}$, $j_{2-1}$, $j_{2-2}$, $c_2$, $j_{1-2}$, $j^{1-1}$, $j_{2-1}$, $j_{2-2}$, and $c_1$. When this group is in a fully expanded configuration as shown in FIG. 15A, the protruding plate of a parallelogram pair is located above the second plate of the parallelogram pair, i.e. the recessed plate.

With reference also to FIGS. 8, 11, and 18A, the common pivotal connection 27 of a pair of laterally pivoting trapezoidal plates $a_{3-4}$ coincides with each of the common pivotal connections 89 between recessed plate $j_{1-2}$ and trapezoidal plate $a_3$ and between recessed plate $j_{2-2}$ and trapezoidal plate $a_4$. Since common pivotal connection 27 of a pair of laterally pivoting trapezoidal plates $a_{3-4}$ is vertically displaced in response to the initiating force, junction 96 between the two pivotal connections 89 and the common pivotal connection 27 is also vertically displaced in the same direction. Consequently the laterally pivoting motion of plates $a_3$ and $a_4$ induces a force component $T_1$ in the X-axis, due to the fixed connection 87 between a recessed plate and a corresponding protruding plate, which acts on common pivotal connection 85 between a pair of protruding plates $j_{1-1}$ and $j_{2-1}$ to cause the latter to be also laterally pivoted. The angle β between adjacent parallelogram pairs continuously decreases from $β_1$ to $β_2$ to an angle $β_3$ of 0 at a fully contracted configuration when the adjacent protruding plates $j_{1-1}$ and $j_{2-1}$ are caused to be in contact with each other, as shown in FIG. 15C. The total width of protruding plates $j_{1-1}$ and $j_{2-1}$ when in contact with each other is $W_2$. Since the two plates of a parallelogram pair are stepped, a cavity 77 of width $W_3$ greater than $W_1$ between adjacent recessed plates $j_{1-2}$ and $j_{2-2}$ is formed when two adjacent parallelogram pairs are laterally pivoted to a fully contracted configuration.

Figures 19A, 19B, 19C:
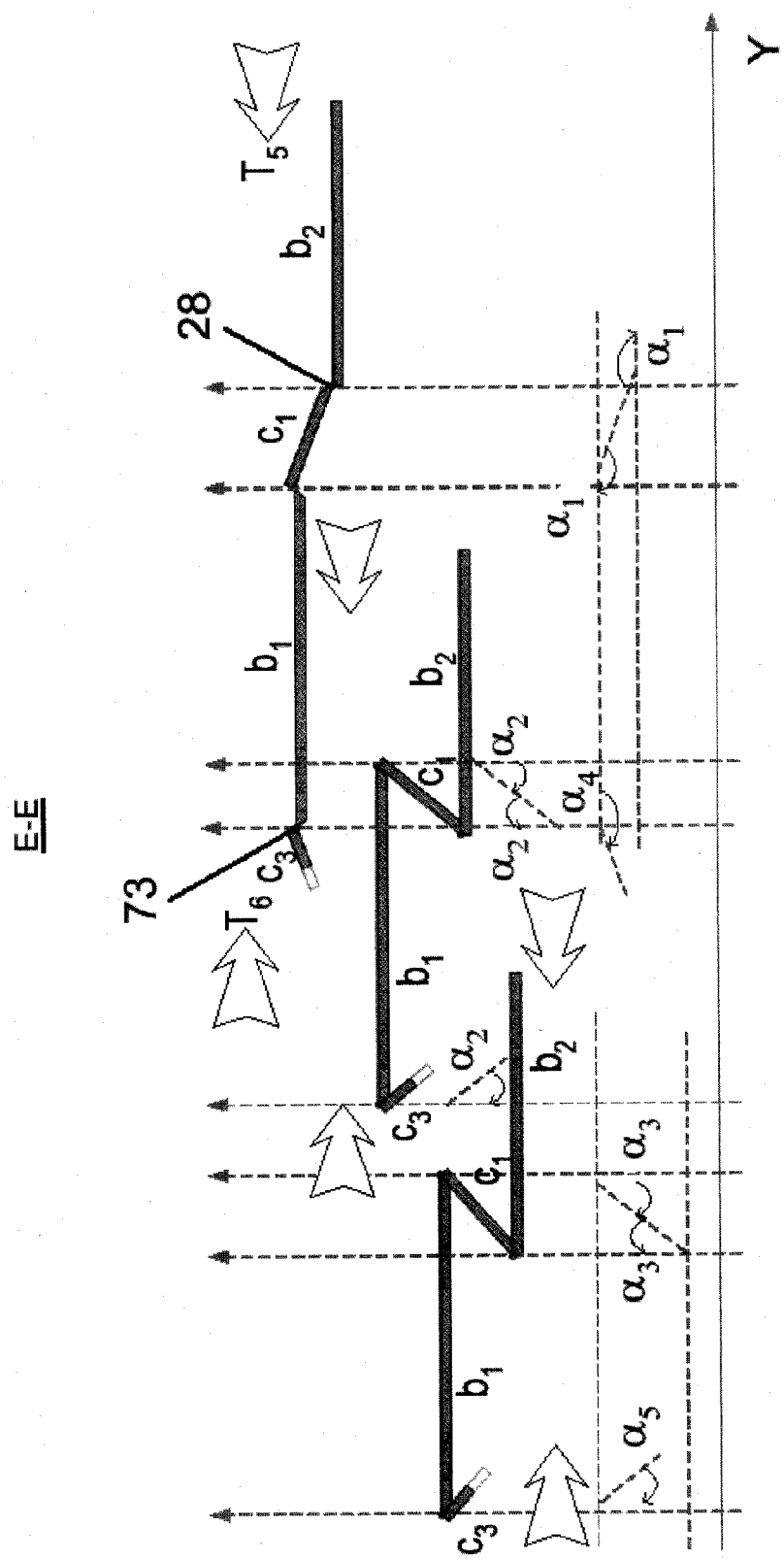
FIGS. 19A-C are three longitudinal cross sections, respectively, of the forward and central sections of the platform, cut about plane E-E of FIG. 9, while undergoing another step of a vehicle dimension adjusting operation caused by the steps of FIG. 14A-C and 16A-C from a fully expanded configuration to a fully contracted configuration.

Likewise, the lateral pivotal motion of the parallelogram pairs induces a force component $T_2$ which acts on common pivotal connection 38 between adjacent trapezoidal plates $a_1$ and $a_2$, as shown in FIGS. 16A-C, which illustrate a lateral cross section of a group of plates of forward section K that includes non-pivoting elements $b_1$ and $b_4$, as well as trapezoidal pairs $a_1$-$a_2$. Force component $T_2$ is applied as a result of the vertical displacement of junction 97 between pivotal connection 85 and the two pivotal connections 86, as shown in FIGS. 8, 11 and 19A. The trapezoidal plates in a fully expanded configuration are positioned slightly above the adjacent non-pivoting elements, as shown in FIG. 16A. Each of trapezoidal plates $a_1$ and $a_2$ is L-shaped and has a relatively long portion 78 and a relatively short portion 79 substantially perpendicular to portion 78. Accordingly, force component $T_2$ causes trapezoidal pairs $a_1$ and $a_2$ to be laterally pivoted such that angle β continuously decreases to an angle $β_3$ of 0 at a fully contracted configuration and that the short portions 79 of an adjacent pair $a_1$-$a_2$ are caused to be in abutting relation, defining a cavity 81 of width $W_4$ greater than $W_2$ between the long portions 78 of an adjacent pair $a_1$-$a_2$.

Simultaneously with the laterally pivoting of a parallelogram pair, the jointly pivoting parallelogram pair also pivots longitudinally, as shown in FIGS. 17A-B, which illustrate a longitudinal cross section of forward section K and central section L of the platform in response to the event illustrated in FIG. 14C. Although the pivotal movement of a group of plates that includes plates $a_4$, $j_{1-2}$, $j_{1-1}$, $a_1$ and $j_3$ is shown, a similar pivotal movement is also applicable for a group of plates that includes plates $a_3$, $j_{2-2}$, $j_{2-1}$, $a_2$ and $j_4$; $a_3$, $j_{1-2}$, $j_{1-1}$, $a_2$ and $j_4$; or $a_4$, $j_{2-2}$, $j^{2-1}$, $a_1$ and $j_3$. Since the longitudinal sides of trapezoidal plates $a_3$ and $a_4$ are oblique with respect to the lateral sides thereof, the outer oblique longitudinal side 67 of trapezoidal plate $a_4$, as also shown for example in FIG. 11, applies a force component $T_3$ on the adjacent side of the corresponding recessed plate when being laterally pivoted. As a result of the application of force component $T_3$ in the Y-axis, parallelogram pair $j_{1-1}$ and $j_{1-2}$ longitudinally pivots about the pivotal connection 89 which is common with plate $a_4$, such that the angle α coinciding with a vertical plane parallel to the Y axis between parallelogram pair $j_{1-1}$ and $j_{1-2}$ and plate $a_4$ continuously decreases from $α_1$ to $α_3$. Trapezoidal plate $a_1$ is caused to become longitudinally displaced by the longitudinally pivoting of parallelogram pair $j_{1-1}$ and $j_{1-2}$. Since trapezoidal plate $a_1$ also undergoes a lateral pivoting motion as shown in FIGS. 16A-C, the outer longitudinal side of plate $a_1$ induces a force component $T_4$ which causes jointly pivoting plate $j_3$ to pivot from $α_4$ to $α_5$ as shown.

Reference is now made to FIG. 18A-C, which illustrate the compact nature of the platform when set to a fully contracted configuration. For clarity, a group 70 of plates comprising a pair of laterally adjacent trapezoidal plates that laterally pivot in opposite rotational directions in each of the forward, central and rear sections, as well as the interconnecting jointly pivoting plates, is shown.

During the jointly pivoting motion of parallelogram pairs $j_{1-1}$ and $j_{1-2}$; $j_{2-1}$ and $j_{2-2}$ as described hereinabove with respect to FIGS. 15A-C and 17A-B, the common pivotal connection 85 of adjacent protruding plates $j_{1-1}$ and $j_{2-1}$ longitudinally pivots towards the central section. That is, pivotal connection 85 is disposed at an obtuse angle with respect to the pivotal connection 27 of trapezoidal plates $a_{3-4}$ in the central section when the platform is at an enlarged size configuration as shown in FIG. 18A, while it is disposed at an acute angle with respect to the pivotal connection 27 when the platform is at a reduced size configuration as shown in FIG. 18C. The longitudinally pivoting motion of pivotal connection 85 is characterized by an upward displacement of junction 96 between pivotal connection 27 and a pair of pivotal connections 89, causing the pair of parallelogram pairs to be upwardly displaced, and by a downward displacement of junction 97 between pivotal connection 85 and a pair of pivotal connections 86.

Accompanying this longitudinally pivoting motion of pivotal connection 85 is a downward laterally pivoting motion of the pivotal connection 86 between a trapezoidal plate in the forward and rear sections and the adjacent jointly pivoting protruding plate of a parallelogram pair. As a result of the jointly pivoting motion of the pair of parallelogram pairs and the laterally pivoting motion of the trapezoidal pairs $a_{3-4}$ and $a_{1-2}$ in opposite rotational directions, the angle between a jointly pivoting plate and a laterally pivoting plate is continuously reduced. Thus a recessed plate is caused to contact a corresponding trapezoidal plate of the central section and a protruding plate is caused to contact a corresponding trapezoidal plate of the forward or rear section.

When group 70 is set to a fully contracted configuration as shown in FIG. 18C, all of the plates are substantially vertically disposed. Abutting plates $a_{3-4}$ of the central section are received in the cavity 77 formed between adjacent recessed plates $j_{1-2}$ and $j_{2-2}$ of the same parallelogram pair. Also, abutting protruding plates $j_{1-1}$ and $j_{2-1}$ of the same parallelogram pair are received in cavity 81 formed between adjacent trapezoidal plates $a_1$ and $a_2$, thereby providing compact plate contraction.

FIGS. 19A-C illustrate a longitudinal cross section of forward section K and central section L, which includes the group of plates that includes longitudinal pivoting plates $c_1$ and $c_3$, as well as non-pivoting elements $b_1$ and $b_2$. Since longitudinally pivoting plate $c_1$ is connected by pivotal connection 88 to an adjacent recessed plate (FIG. 8), e.g. plate $j_{1-2}$, plate $c_1$ is caused to be longitudinally pivoted from $\alpha_1$ to $\alpha_3$ about pivotal connection 28 by means of force component $T_5$ as a result of the pivotal motion of the recessed plate shown in FIGS. 17A-B and 18A-C. Since longitudinally pivoting plate $c_3$ is connected by pivotal connection 93 to an adjacent jointly pivoting plate (FIG. 8), e.g. plate $j_4$, plate $c_1$ is caused to be longitudinally pivoted from $\alpha_4$ to $\alpha_5$ about pivotal connection 73 by means of force component $T_6$ as a result of the pivotal motion of the jointly pivoting plate shown in FIGS. 17A-B.

In other embodiments of the invention, a platform may be solely laterally adjustable when only central section L (FIG. 8) is provided and connected to non-pivoting vehicular members. Alternatively, a platform may be solely longitudinally adjustable when a plurality of longitudinally pivotable plates are connected to non-pivoting vehicular members and are caused to pivot by means of one or more the force initiators.

Figure 20A:
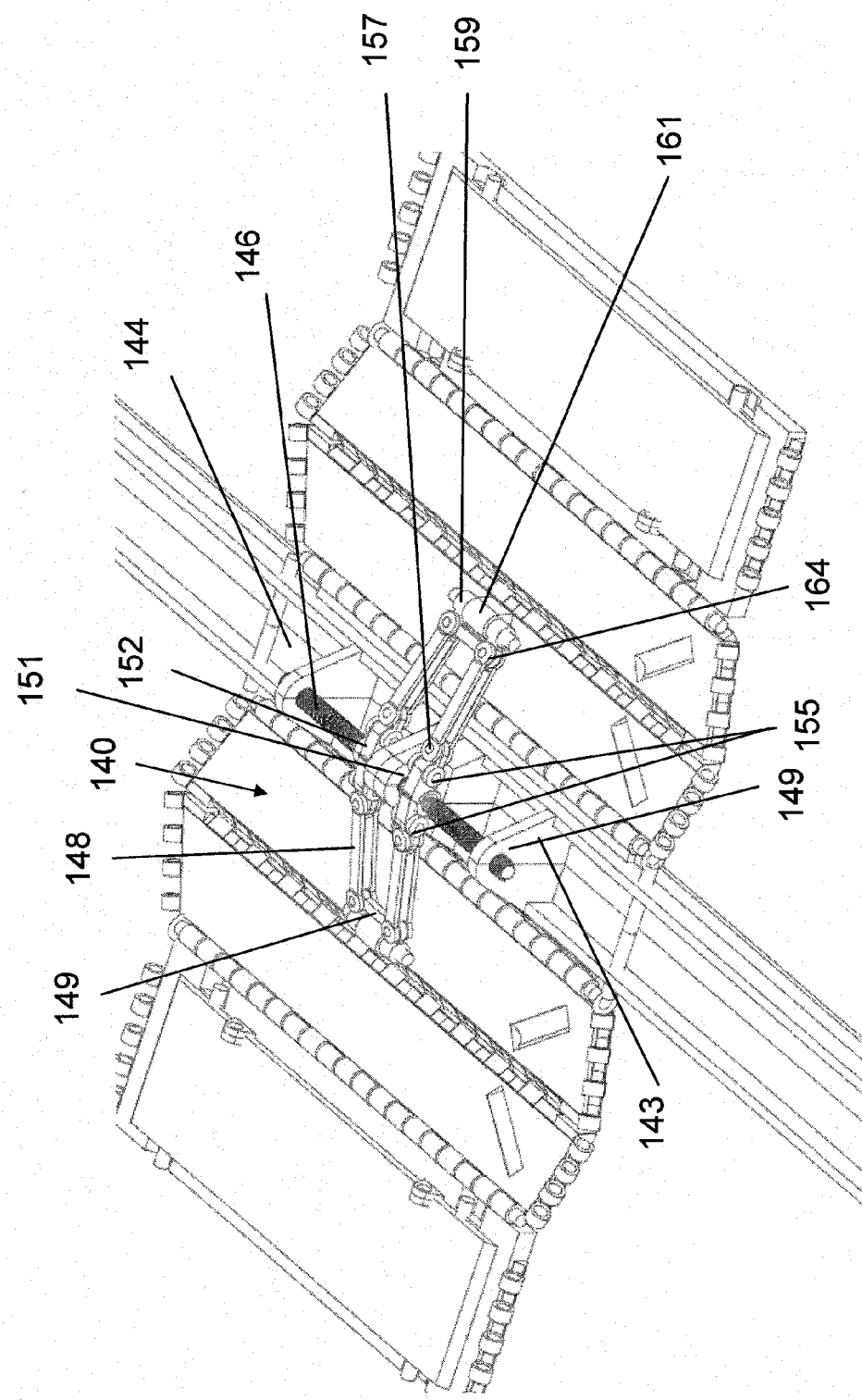

FIGS. 20A-C illustrate a dimension adjusting operation that may be carried out by means of a jack device according to one embodiment of the invention, from a fully expanded configuration to a fully contracted configuration. Although the plates described in these drawings are not identical to those shown in FIGS. 8 and 11, it will be appreciated that the jack device is applicable with respect to the platform shown in FIGS. 8 and 11.

An exemplary jack device 140 comprises two or more longitudinally separated supports 143 and 144 that vertically protrude from a non-pivoting plate, e.g. plate $b_5$ in the central section L of the platform (FIG. 8). A longitudinally extending ballscrew 146 is rotatably mounted within an aperture 149 formed within each of the supports. Two roller mounted nut members 151 and 152 are threadedly engaged with the ballscrew and are longitudinally displaced along the ballscrew as the latter is rotated, preferably by means of an electric motor. Two laterally spaced, horizontally oriented rollers 155 are rotatably mounted to each nut member. A generally vertically oriented roller 157 is rollingly engaged with a roller 155 at each lateral end of a nut member. A longitudinally extending cylindrical roller 159 is rotatably mounted, e.g. by means of a U-bracket 161, to each laterally pivoting plate adjacent to the non-pivoting plate, e.g. plates $a_4$. Two generally vertically oriented, longitudinally spaced rollers 164 are rollingly engaged with each roller 159 mounted to a laterally pivoting plate.

Jack device 140 also comprises a linkage wherein a relatively long link 148 (hereinafter "long link") extends from each roller 157 to the closest roller 164 engaged with a plate mounted roller 159, and a relatively short link 149 (hereinafter "short link") extends between the two rollers 164 rollingly engaged with each plate mounted roller 159. When the platform is at a fully expanded configuration, as shown in FIG. 20A, the linkage is substantially rectangular and horizontal.

When the initiating force is applied, ballscrew 146 is rotated and the two nut members 151 and 152 become additionally separated, as shown in FIG. 20B, causing the long links 148 to become obliquely disposed with respect to the short links 149 while all links of the linkage remain substantially coplanar. As a result of the longitudinal movement of nut members 151 and 152, each obliquely disposed long link 148 applies a pulling force G in a direction towards the corresponding nut member and causes the adjacent pairs of laterally adjacent plates to laterally pivot about the common pivotal connection.

During continued application of the initiating force, each nut member 151 and 152 contacts a corresponding support and additional longitudinal displacement is therefore prevented, as shown in FIG. 20C. Although each nut member ceases to be longitudinally displaced, a force continues to be transmitted through each long link 148 and therefore causes the laterally adjacent plates to be additionally laterally pivoted about the common pivotal connection. In response to the laterally pivoting motion, the orientation of the long links 148 changes so as to be substantially collinear with a corresponding short link 149. While the laterally pivoting plates achieve an essentially vertical disposition after being laterally pivoted to a fullest extent, the angle of each row 167 of long and short links with respect to a horizontal plane is changed since each roller 157 rolls about a corresponding horizontal roller 159 with which it is rollingly engaged.

It will be appreciated that other force initiators well known to those skilled in the art may also be employed for initiating a longitudinally or laterally pivoting operation. The force initiator may be positioned within the central section, forward section, or rear section, depending on the type of pivoting operation to be initiated. Likewise, the force initiator may be oriented in a selected fashion so as to transmit the initiating force in a desired direction. For example, the linkage of a jack device may be in force transmitting relation with two longitudinally separated jointly pivoting plates, for initiating a dimension adjusting operation with a longitudinally pivoting action.

Figure 21A:
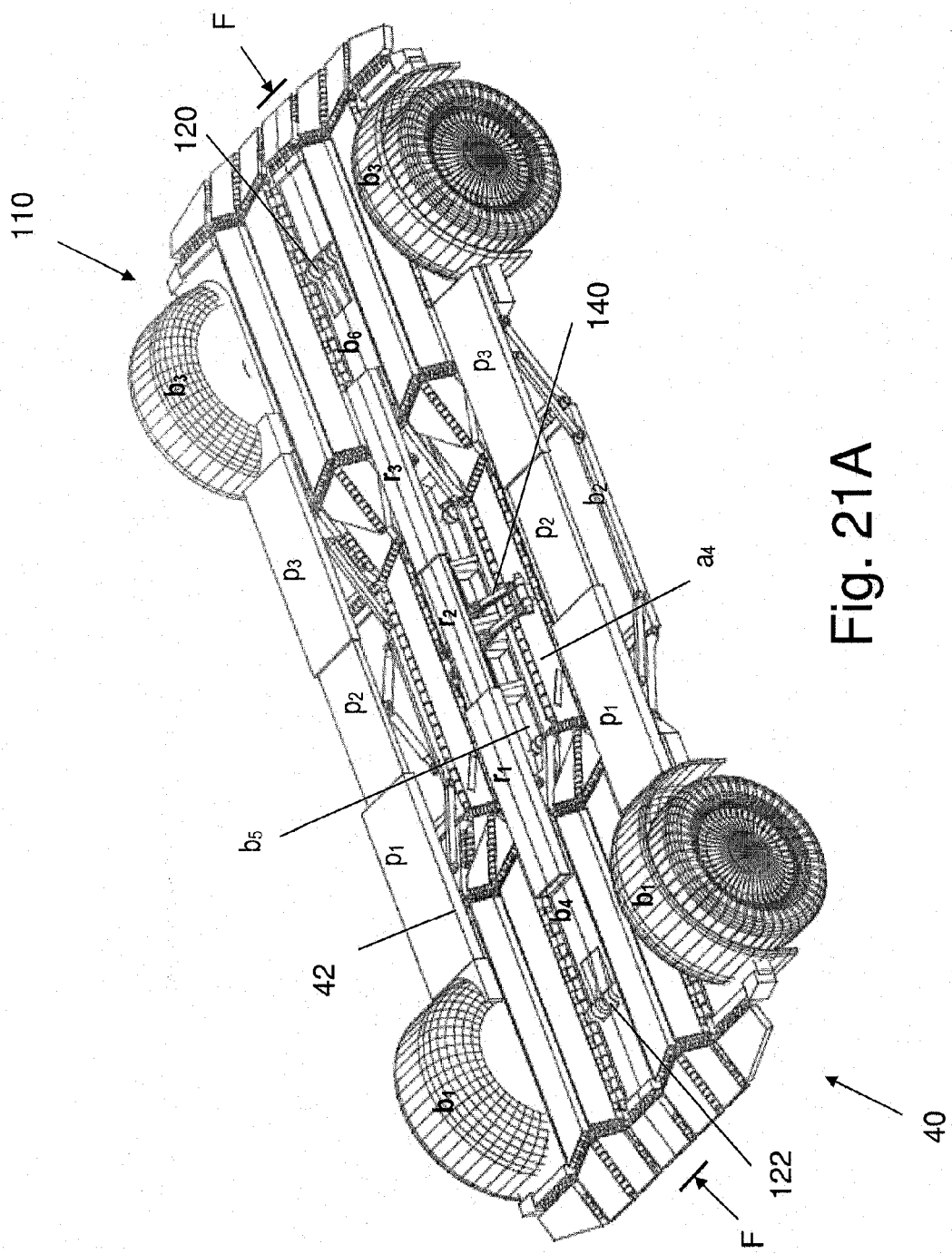
FIG. 21A is a perspective view from the top of a platform, according to another embodiment of the present invention, shown in a fully expanded configuration.
Figure 21D:
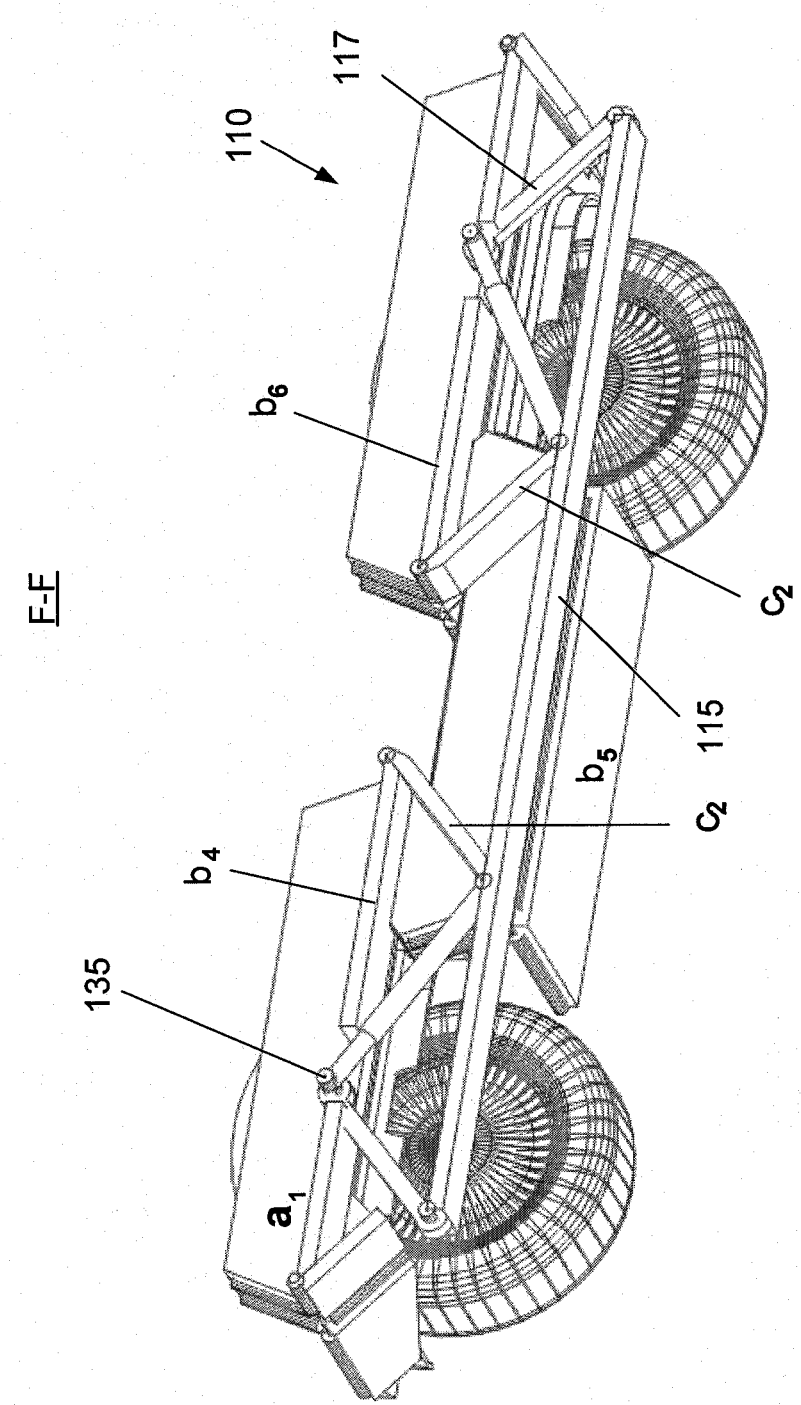
FIG. 21D is a perspective, cross sectional view from the side and bottom of the platform of FIG. 21A, cut about plane F-F of FIG. 21A while shown in a fully contracted configuration.

Another embodiment of a platform is illustrated in FIG. 21-D. Platform 110 is similar to platform 40 illustrated in FIGS. 8 and 9, and additionally comprises a plurality of rectangular, horizontal, and longitudinally extendable and contractible plates. FIG. 21A illustrates platform 110 in a fully expanded configuration, and the platform is illustrated in FIGS. 21C-D when set to a fully contracted configuration.

As shown in FIG. 21A, a plate $p_1$ is connected to the planar portion 42 of each forward wheel protector $b_1$ and a plate $p_3$ is connected to the planar portion of each rear wheel protector $b_3$. Plate $p_2$ is telescopingly connected to, and interposed between, plates $p_1$ and $p_3$ when platform 110 is set to a fully expanded configuration. Plates $p_{1-3}$ overly a corresponding non-pivoting plate $b_2$, but do not overly a laterally adjacent laterally pivoting plate. Likewise, plates $r_1$ and $r_3$ are connected to non-pivoting plates $b_4$ and $b_6$, respectively, and a plate $r_2$ is telescopingly connected to, and interposed between, plates $r_1$ and $r_3$ when platform 110 is set to a fully expanded configuration. Plates $r_{1-3}$ overly non-pivoting plate $b_5$, but do not overly a laterally adjacent laterally pivoting plate. Jack device 140 is mounted onto non-pivoting plate $b_5$ and is in force applying connection to adjacent laterally pivoting plates $a_4$. A cutout 122 is formed in each of non-pivoting plates $b_4$ and $b_6$ for the protrusion therethrough of a corresponding stabilizing unit 120, as will be described hereinafter.

In FIG. 21B, platform 110 is set to an intermediate size configuration. Since wheel protectors $b_1$ and $b_3$ are brought closer together than the configuration shown in FIG. 21A, each plate $p_2$ is received in a corresponding plate $p_3$ and plate $p_3$ is partially received in plate $p_1$. Also, plate $r_2$ is received in plate $r_3$ and plate $r_3$ is partially received in plate $r_1$. The longitudinal displacement of the plates will cease upon termination of the initiation force. Adjacent longitudinally extendable plates may be fixatable upon termination of the initiation force by means of an electromechanically actuatable device.

It will be appreciated that the plurality of longitudinally extendable and contractible plates may be provided in a platform that does not have any pivoting plates.

FIG. 21C illustrates a perspective, cross sectional view of the platform. A narrow, horizontally disposed support beam 115 longitudinally extends substantially the entire length of platform 110. Beam 115, which is located below all plates of platform 110, is positioned at essentially the lateral centerline 112 of the platform. A stabilizing unit 120 is pivotally connected to beam 115 and to each of the non-pivoting plates $b_4$ and $b_6$. The two stabilizing units 120 pivotally connected to plates $b_4$ and $b_6$, respectively, are symmetrical.

Stabilizing unit 120 comprises a bar 117 that is pivotally attached at a bottom end thereof to a corresponding longitudinal end of support beam 115 by means of element 139, and a telescopingly extendable rod 118 that is pivotally connected at a bottom end thereof to support beam 115 by means of an element 138, which is inwardly spaced from element 139 and located substantially below the longitudinal end of a longitudinally extendable plate, e.g. $r_3$. The top end of a corresponding bar 117 and telescopingly extendable rod 118 are positioned in laterally adjacent relation such that they are both rotatably mounted onto a common laterally extending element 135 that is connected to the walls of cutout 122.

When platform 110 is set to a fully expanded configuration, as shown in FIG. 21A, each bar 117 pivots about element 139 such that its top end is longitudinally displaced beyond element 139 and the corresponding rod 118 is caused to be extended. When platform 110 is contracted, the angle γ of bar 117 and of rod 118 with respect to beam 115 continuously changes. At the position shown in FIG. 21C, the angle γ of both bar 117 and of rod 118 is approximately 45 degrees, providing optimal stability for platform 110 by such a triangular formation when it ceases to be dimensionally adjusted. Upon conclusion of the dimension adjusting operation, rod 118 may be fixated by means well known to those skilled in the art.

FIG. 21D illustrates the same vertical cross-section of platform 110 as that shown in FIG. 21C, but at a different perspective view, and without showing the longitudinally extendable plates. Support beam 115 may be attached to the underside of non-pivoting plate $b_5$ of the central section, so that the pivotal connections 69 and 71 (FIG. 8) by which the two longitudinally pivoting plates $c_2$ are pivotally connected to non-pivoting plate $b_4$ and $b_6$, respectively, are also connected to beam 115. For each non-pivoting and non-extendable plate pivotally connected to a corresponding laterally pivoting plate $a_1$, bar 117 and longitudinally pivoting plate $c_2$ are substantially mutually parallel. Accordingly the platform advantageously provides two parallelogram formations associated with beam 115. Each parallelogram formation, which includes a bar 117, a longitudinally pivoting plate $c_2$, a portion of beam 115 extending from bar 117 to longitudinally pivoting plate $c_2$, and a portion of the non-pivoting plate $b_4$ or $b_6$ extending from element 135 to longitudinally pivoting plate $c_2$, supports and stabilizes the platform during a dimension adjusting operation.

It will be appreciated that platform 40 illustrated in FIG. 8 may also be configured with two stabilizing units 120 and with two support providing parallelogram formations.

Figure 22:
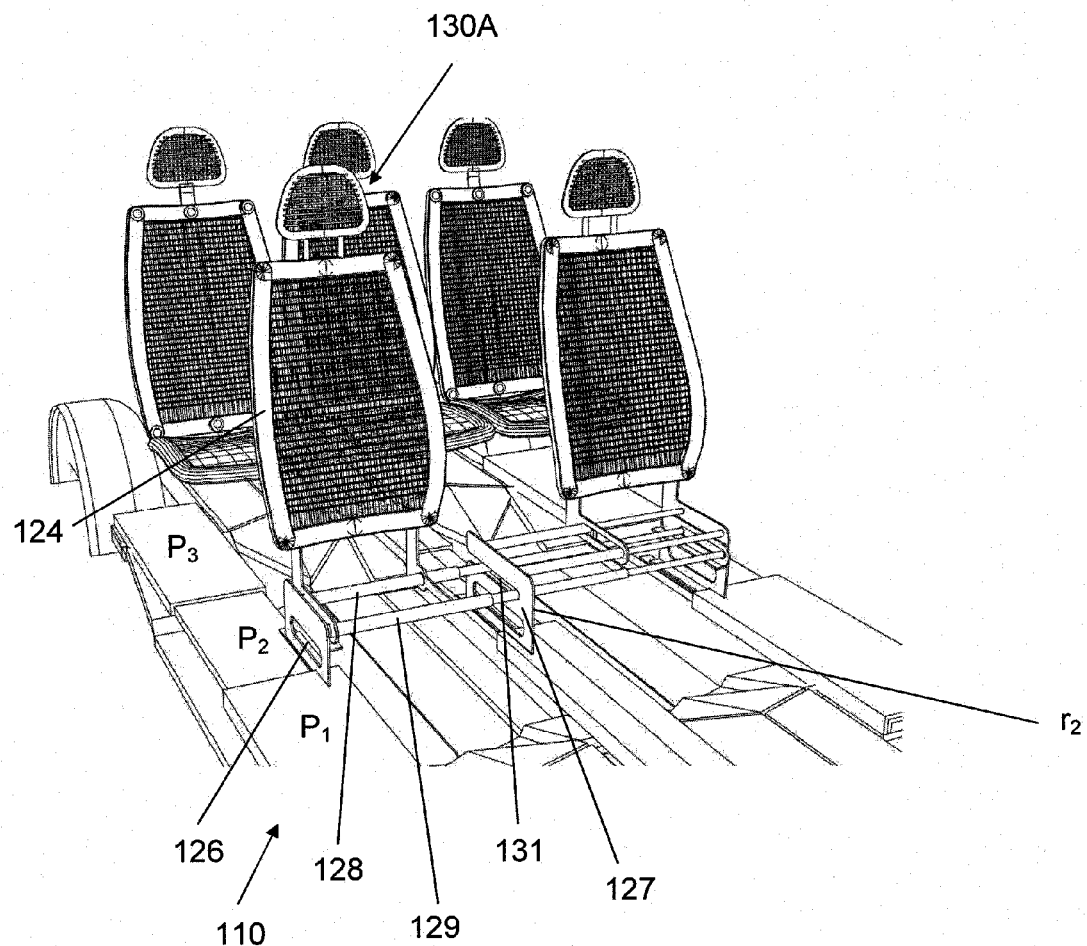
FIG. 22 illustrates a perspective view from the front of a plurality of seat assemblies that are connected to the platform of FIG. 21A.
Figure 23:
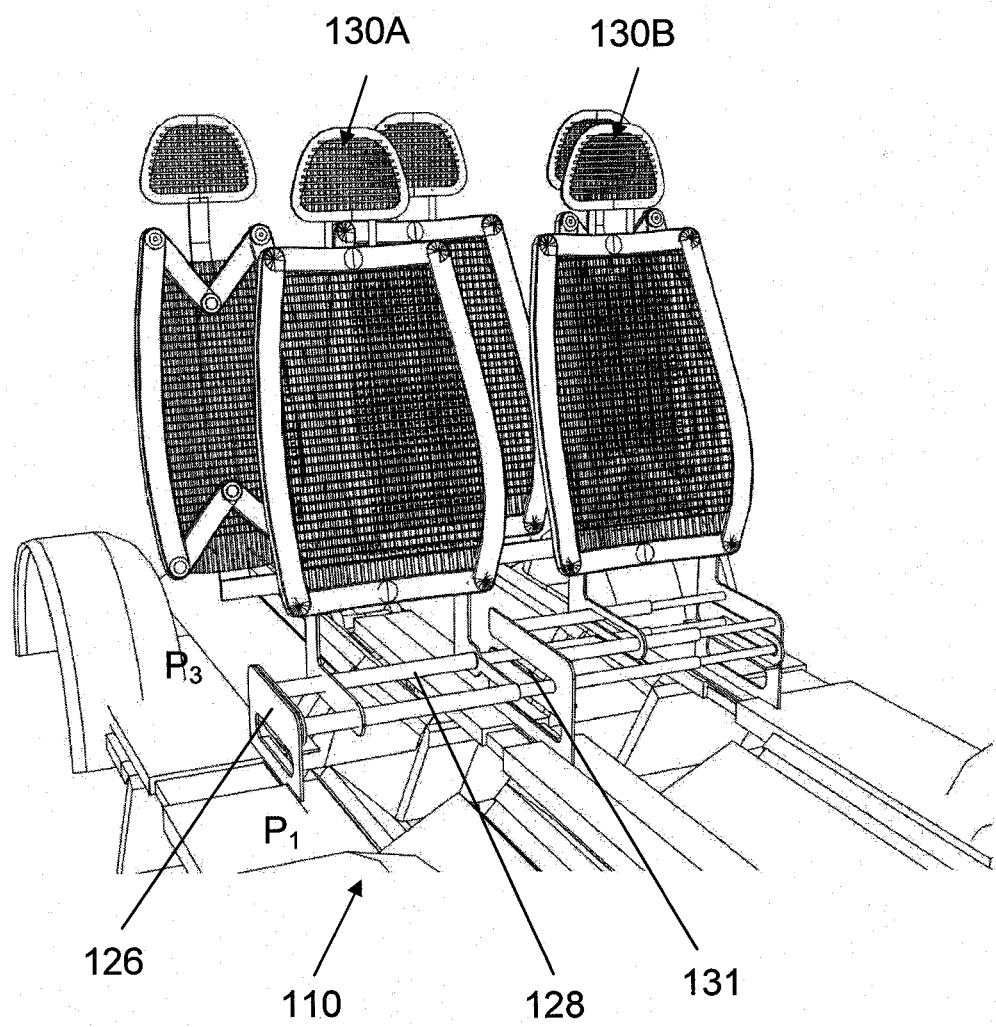
FIG. 23 illustrates a perspective view from the front of a plurality of seat assemblies, after the platform of FIG. 21A has been dimensionally adjusted.
Figure 24:
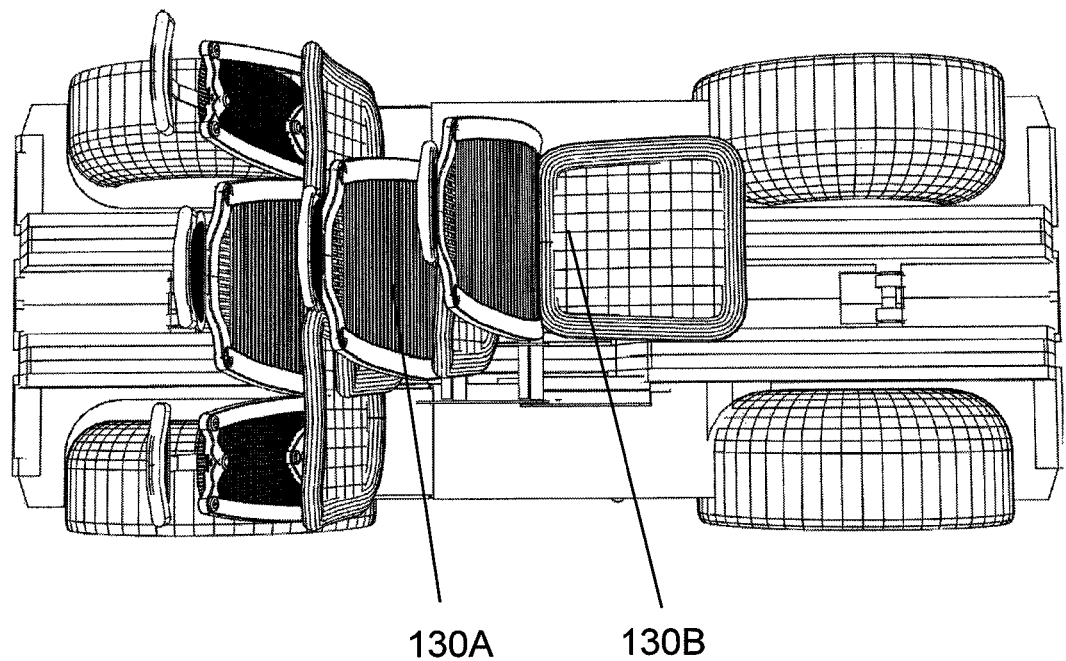
FIG. 24 illustrates a top view of a plurality of seat assemblies, after the platform of FIG. 21A has been dimensionally adjusted.

FIGS. 22-24 illustrate the repositioning of seats that are mounted to the plates of platform 110, according to one embodiment of the invention.

As shown in FIG. 22, each seat assembly 130 comprises a backrest 124, two vertically disposed, grooved fixtures 126 and 127 that are attached to, and protrude upwardly from, corresponding longitudinally extendable plates of platform 110, and two laterally extending rods 128 and 129 that are displaceable within a groove 131 of fixtures 126 and 127. Fixture 126 of seat assembly 130A, for example, protrudes from plate $p_2$ and fixture 127 thereof protrudes from plate $r_2$.

FIG. 23 illustrates platform 110 after it has been dimensionally adjusted. Seat assembly 130B is provided for the driver and is caused to be stationary. Due to the dimensional adjustment of platform 110, the spacing between plates $p_1$ and $p_3$ is reduced relative to that which is shown in FIG. 22. Accordingly, rod 128, which is carried by fixture 126, is displaced rearwardly along groove 131 until it is dislodged therefrom. After rod 128 is dislodged from groove 131, seat assembly 130A is free to be laterally displaced.

FIG. 24 illustrates the lateral displacement of seat assembly 130A with respect to seat assembly 130B.

It will be appreciated that other means for reorientating a seat assembly during a dimension adjusting operation are within the scope of the invention.

In another embodiment of the invention, a dimension adjusting operation may be carried out when the vehicle is in transit. In this embodiment, all four wheels are independently driven by a corresponding electric motor. An onboard computer in electrical communication with the four motors and with the force initiator commands each of the wheels to follow a predetermined path in order to ensure that the vehicle continues to travel stably despite undergoing a dimension adjusting operation. For example, the rear wheels may spin at a higher speed than the front wheels when the platform is being reduced in size, in order to minimize the magnitude of friction applied to the front wheels and to ensure safety of the vehicle and of the passengers while in transit. Conversely, when the platform is being enlarged, the rear wheels may be set to a fixed angle and to a constant speed while the front wheels are operated at a slightly higher speed, to follow a desired path. The frictional force that is input to the onboard computer may be a constant anisotropic force that is applied all around a tire rather than being localized.

The onboard computer may acquire data regarding various parameters such as minimal desired distance in a line of sight until a next target object, current speed, and curvature of road. If an autopilot is employed for automatically steering each of the four wheels and for functioning as a force initiator, a predetermined initial constant speed for locking the front wheels may be set.

The four independently driven wheels may also function as the platform force initiator. Upon release of the fixation means by which adjacent plates or the stabilizing units were fixated, such by a command transmitted by the onboard computer, the front and rear wheels may be commanded to rotate in opposite directions, to initiate a longitudinal dimension adjusting operation.

Alternatively, the onboard computer may command the wheels to rotate to an oblique angular disposition and then command the right and left wheels to rotate in opposite directions, to initiate a lateral dimension adjusting operation or a synchronous longitudinal and lateral dimension adjusting operation.

According to another embodiment, the folding mechanism illustrated above for changing the dimensions of the platform may be designed such that the plurality of interconnected rigid incompressible pivoting plates (the foldable parts) will extend downwardly, rather than upwardly. This is a similar design that may be implemented by any person skilled in the art according to which, the same platform is actually flipped by 180°.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A dimensionally adjustable vehicle that is adjustable both lengthwise and widthwise simultaneously, comprising a platform of pivoting and non-pivoting plates arranged such that the spacing between a pair of said non-pivoting plates is changed to dimensionally adjust said vehicle upon application of an initiating force to a plurality of said pivoting plates which causes a pivoting motion, characterized in that at least one of said pivoting plates is a jointly pivoting plate that is both laterally pivoting and longitudinally pivoting and that is pivotally connected to a plate in a central section and to a plate in a forward or rear section.

2. The vehicle according to claim 1, wherein a section of the platform comprises a pair of laterally adjacent and laterally pivoting plates which is interposed between a pair of the non-pivoting plates such that a lateral side of each of said laterally pivoting plates is pivotally connected to a lateral side of an adjacent non-pivoting plate, application of the initiating force to at least one of said pair of laterally adjacent and laterally pivoting plates causing a lateral dimension of the vehicle to be adjusted.

3. The vehicle according to claim 1, wherein the jointly pivoting plate comprises a protruding plate and a recessed plate that are fixedly connected to, or integrally formed with, each other.

4. The vehicle according to claim 3, wherein the recessed plate is pivotally connected to a longitudinal side of a laterally pivoting plate in the central section and to a laterally adjacent longitudinally pivoting plate.

5. The vehicle according to claim 3, wherein the protruding plate is pivotally connected to a laterally adjacent protruding plate and to a longitudinal side of a laterally pivoting plate in the forward or rear section.

6. The vehicle according to claim 1, wherein the platform further comprises a plurality of longitudinally extendable and contractible plates which are displaceable during a longitudinal adjustment operation.

7. The vehicle according to claim 6, wherein a first longitudinally extendable plate is connected to a non-pivoting plate in the forward section, a second longitudinally extendable plate is connected to a non-pivoting plate in the rear section, and a third longitudinally extendable plate is interposed between, and telescopingly connected to, said first and second longitudinally extendable plates.

8. The vehicle according to claim 5, wherein the central section comprises two pairs of laterally pivoting plates and the initiating force is applied simultaneously to two laterally adjacent laterally pivoting plates in the central section.

9. The vehicle according to claim 1, wherein the jointly pivoting plate is pivotally connected to a laterally pivoting plate in the central section and to a laterally pivoting plate in the forward section or in the rear section, thereby transmitting the initiating force to the laterally pivoting plate in the forward section or in the rear section and causing both a lateral dimension and a longitudinal of the vehicle to be simultaneously adjusted.

10. The vehicle according to claim 2, further comprising a force initiator for applying the initiating force to a plurality of the pivoting plates.

11. The vehicle according to claim 10, wherein the force initiator is a jack device comprising a linkage which is in force transmitting relation with two laterally spaced laterally pivoting plates, operation of said jack device causing said two plates to be laterally pivoted and the platform to undergo a dimension adjusting operation in response the lateral pivoting of said two plates.

12. The vehicle according to claim 10, wherein the force initiator is a jack device comprising a linkage which is in force transmitting relation with two longitudinally spaced laterally pivoting plates, operation of said jack device causing said two plates to be longitudinally pivoted and the platform to undergo a dimension adjusting operation in response the longitudinal pivoting of said two plates.

13. The vehicle according to claim 1, further comprising a support beam located below all plates of the platform and two stabilizing units for stabilizing the platform upon conclusion of a dimension adjusting operation, said two stabilizing units being pivotally connected to said beam and to a non-pivoting plate in the front and rear sections, respectively.

14. The vehicle according to claim 13, wherein each of the two stabilizing units is fixatable.

15. The vehicle according to claim 1, wherein the plates of the central section are located below or above the plates of the front and rear sections.

16. The vehicle according to claim 1, further comprising means for reorientating one or more seat assemblies during a dimension adjusting operation.

17. The vehicle according to claim 2, wherein the laterally pivoting plates are trapezoidal, symmetrical, and elongated.

18. The vehicle according to claim 1, wherein a folding mechanism for changing the dimensions of the platform is implemented such that a plurality of interconnected rigid incompressible pivoting plates extends downwardly.

19. The vehicle according to claim 10, which is dimensionally adjustable when in transit.

20. The vehicle according to claim 19, wherein all of its wheels are independently driven by a corresponding electric motor, the vehicle further comprising an onboard computer in electrical communication with each of said motors and with the force initiator, for commanding each of the wheels to follow a predetermined path in order to ensure that the vehicle continues to travel stably despite undergoing a dimension adjusting operation.

* * * * *